United States Patent [19]

Ri et al.

[11] Patent Number: 4,547,823
[45] Date of Patent: Oct. 15, 1985

[54] MODE CHANGING APPARATUS

[75] Inventors: Masao Ri, Tokyo; Kenji Ohhara, Chiba; Yoshinori Yamamoto, Yokohama; Akira Takada, Abiko; Hisanori Watanabe, Kanagawa; Yasuo Osada, Tokyo, all of Japan

[73] Assignee: Sony Corporation, Tokyo, Japan

[21] Appl. No.: 480,513

[22] Filed: Mar. 30, 1983

[30] Foreign Application Priority Data

Mar. 31, 1982 [JP] Japan .................................. 57-52895

[51] Int. Cl.$^4$ .............................................. G11B 5/44
[52] U.S. Cl. ........................................ 360/90; 360/93; 360/96.3; 360/105; 360/137
[58] Field of Search ................. 360/90, 93, 96.4, 96.1, 360/96.3, 105, 71, 73-74, 137; 242/199-201, 206, 208-210

[56] References Cited

U.S. PATENT DOCUMENTS

| | | |
|---|---|---|
| 3,976,263 | 8/1976 | Suzuki .................................. 242/201 |
| 4,024,580 | 5/1977 | Ban et al. ............................. 360/96 |
| 4,149,202 | 4/1979 | Terada et al. ....................... 360/96.3 |
| 4,167,764 | 9/1979 | Hanajima et al. .................... 360/90 |
| 4,219,852 | 8/1980 | Magata et al. ....................... 360/90 |
| 4,313,142 | 1/1982 | Uchida ................................. 360/105 |
| 4,399,475 | 8/1983 | Shimomae ......................... 360/96.3 |
| 4,403,265 | 9/1983 | Okada et al. ...................... 360/96.5 |
| 4,420,783 | 12/1983 | Suezawa et al. .................... 360/137 |

Primary Examiner—Stuart N. Hecker
Assistant Examiner—B. Urcia
Attorney, Agent, or Firm—Lewis H. Eslinger; Alvin Sinderbrand

[57] ABSTRACT

A feather-touch mode changer having low power requirements and being capable of selectively providing a plurality of modes of operation of a tape recording/reproducing apparatus, has two changing mechanisms which are each of the type that includes a rotatable changing gear with a toothless gap, a selectively actuable trigger for causing initial angular displacement of the changing gear from an inactive position in which the toothless gap faces a drive gear to an actuating position in which the changing gear engages the drive gear, and an actuating lever that moves in a response to the rotation of the changing gear by the drive gear. The two changing mechanisms are selectively actuable, and a single drive gear is positioned for engagement with both changing gears. Each of the two changing mechanisms has associated with it a selectively energizable electromagnetic device and a locking lever that moves into a locking position in response to movement of the respective actuating lever. Each electromagnetic device is energized upon actuation of the respective trigger means to magnetically hold the respective locking lever in its locking position. The mode changing apparatus also includes mode establishing mechanisms comprising a plurality of cooperating gears and levers that are engaged by the actuating and locking levers upon selective operation of the changing mechanisms to establish FWD, FF, REW, PAUSE and ADS (Automatic Detection of Silence) modes of operation of the tape recording/reproducing apparatus.

13 Claims, 30 Drawing Figures

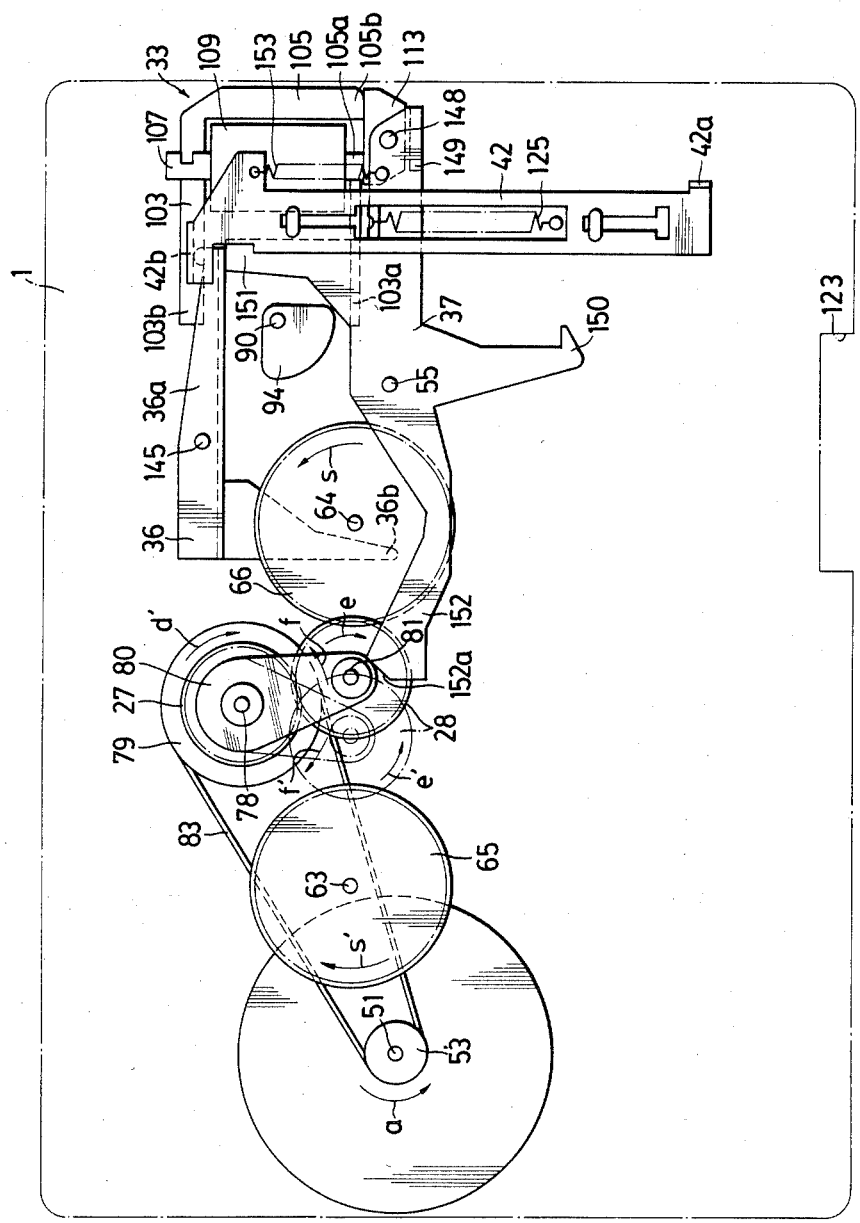

4,547,823

MODE CHANGING APPARATUS

BACKGROUND OF THE INVENTION

1. Field of the Invention

The present invention relates to a mode changing apparatus for a tape recording and/or reproducing apparatus (hereinafter referred to as a tape recorder) and, more particularly, to a feather-touch mode changing apparatus.

2. Description of the Prior Art

Various types of feather-touch mode changing apparatus for tape recorders are known in the prior art. One that is particularly suitable for battery-powered tape recorders, because it requires very little power, comprises a mode changing mechanism that uses a changing gear having a toothed periphery with a toothless portion and having a cam and a magnet secured to the changing gear. An electromagnet, comprising a solenoid coil wound on a yoke having legs opposing the poles of the gear-mounted magnet, provides an initial, or triggering, rotation of the changing gear through a small angle when the coil is energized. At that stage, the toothed portion of the changing gear meshes with a drive gear. An actuating lever is moved by the cam from an inactive position to an active position as the drive gear rotates the changing gear. The actuating lever shifts an operating member, such as a plate carrying a recording head, into an operative position. The only power required for the mode change in that type of apparatus is the power needed to run the motor to turn the drive gear and that needed to momentarily energize the solenoid to trigger the changing gear.

Conventionally, several of those mode changers are required to provide the desired number of modes for the tape recorder. Furthermore, conventional arrangements use a mechanical locking mechanism to hold the operating member in its operative position after the actuating lever has moved it there. (See, for example U.S. Pat. No. 3,976,263 and U.S. Pat. No. 4,167,764.) To then move the operating member to its inoperative position requires an unlocking mechanism. The number of mode changers, with their associated changing gears and electromagnets, and the locking and unlocking mechanisms, make the tape recorders bulky, complex and expensive to manufacture.

SUMMARY OF THE INVENTION

Accordingly, it is an object of the present invention to provide a mode changing apparatus for a tape recording/reproducing apparatus that avoids the foregoing problems associated with the prior art mode changing apparatus.

It is another object of the present invention to provide a mode changing mechanism which uses a pair of mode changing members and which is capable of establishing a plurality of modes of operation while avoiding the use of mechanical unlocking mechanisms in changing from one mode to another.

In accordance with one aspect of the present invention, a mode changing apparatus comprises a changing mechanism of the type including a rotatable changing gear having a toothless portion on the toothed periphery thereof, a magnet mounted on said changing gear for rotation therewith and electromagnetic yoke means for cooperating with the magnet to cause initial angular displacement of the changing gear from position, in which the toothless gap faces a drive gear, to an actuating position, in which the toothed periphery engages the drive gear, when the yoke means is energized. The mode changing apparatus comprises a pair of mode changing members engageable with cam means mounted to said changing gear for rotation therewith and movable, in response to rotation of the changing gear, from inactive to active positions against the force of spring means. The mode changing apparatus also comprises holding means movable toward a holding position in response to movement of the mode changing members toward the active positions. The holding means, in the holding position, holds the mode changing members in the active positions against the force of the spring means. Armature means mounted to the holding means moves into contact with the yoke means in response to movement of the holding means toward the holding position and magnetically holds the holding means in the holding position.

In accordance with a specific embodiment of the invention, the mode changing members comprise an actuating lever means movable by said cam means and a locking lever means. The holding means includes a holding arm on the locking lever means. The locking lever means is thus held in the active position by the yoke means, which prevents the actuating lever from returning to the inactive position.

The above, and other objects, features and advantages of the present invention, will be apparent from the following detailed description of an illustrative embodiment thereof which is to be read in conjunction with the accompanying drawings in which the same reference numerals are employed to identify corresponding parts in the several views.

BRIEF DESCRIPTION OF THE DRAWINGS

FIGS. 16A to 16D are front views of the tape recorder shown in FIG. 1 with the chassis removed and illustrating the configuration of the elements of the mode changing apparatus of the present invention in various modes of operation of the tape recorder;

DETAILED DESCRIPTION OF AN ILLUSTRATIVE EMBODIMENT

An embodiment of the present invention incorporated in a compact cassette-type tape recording/reproducing apparatus will now be described with reference to the accompanying drawings.

Figure 1:
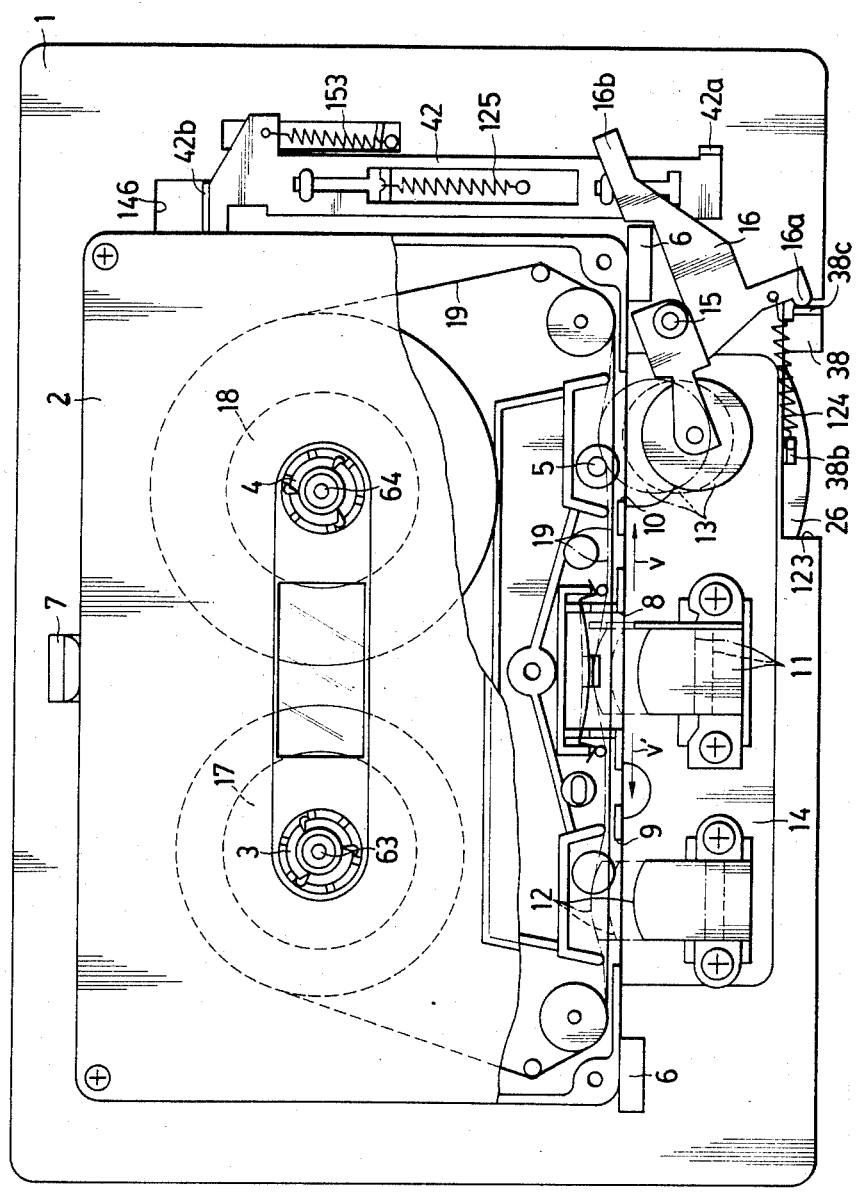
FIG. 1 is a partially cutaway front view of part of a tape recorder, having a tape cassette mounted therein, that incorporates mode changing apparatus in accordance with the present invention.

The tape recorder is operated at its front side as shown in FIG. 1. The tape recorder includes a chassis 1 that is upright in the recorder's normal position. A tape cassette 2 is mounted on the front of the chassis 1 parallel thereto. A pair of positioning projections 6 and a leaf spring 7 are mounted on the front surface of the chassis 1 to position the cassette 2. The cassette 2 is vertically loaded so that a recording/reproducing head insertion window 8 and an erase head window 9 and a pinch roller insertion window 10 at the sides of the window 8, face downward. The windows 8, 9 and 10 oppose a recording/reproducing head 11, an erasing head 12 and a pinch roller 13, respectively, all of which are mounted on the front of the chassis 1. The heads 11 and 12 are fixed to a head base plate 14 that is mounted on the front of the chassis 1 for vertical translation relative thereto. A pivot pin 15 extends from the front of the chassis 1 to pivotally mount a pinch roller lever 16, which carries the pinch roller 13. The STOP mode position of the heads 11 and 12 and the pinch roller 13 are shown in solid lines in FIG. 1. The uniformly dashed lines depict the positions of the heads and pinch roller in an Automatic Detection of Silence (ADS) mode and of the pinch roller in the PAUSE mode. The dot-dash lines show the heads and the pinch roller's positions in the FWD mode and the heads' positions in the PAUSE mode. A pair of reel hubs 17 and 18 in the cassette 2 carry a magnetic tape 19. When the cassette 2 is loaded in the tape deck, the reel hubs 17 and 18 drivingly engage a supply reel table 3 and a take-up reel table 4, respectively, on the front of the chassis 1. A capstan 5 is inserted behind the tape 19 at the pinch roller window 10.

Figure 2:
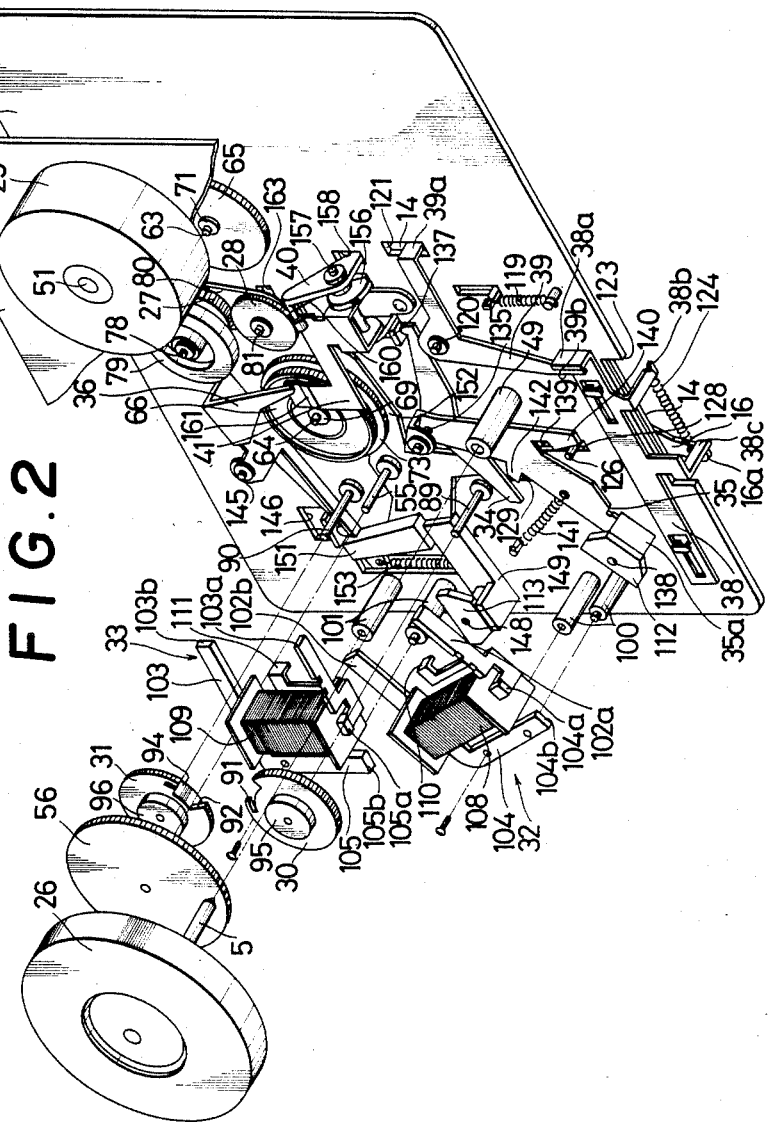
FIG. 2 is an exploded perspective view of the rear of the chassis of the tape recorder shown in FIG. 1.
Figure 3:
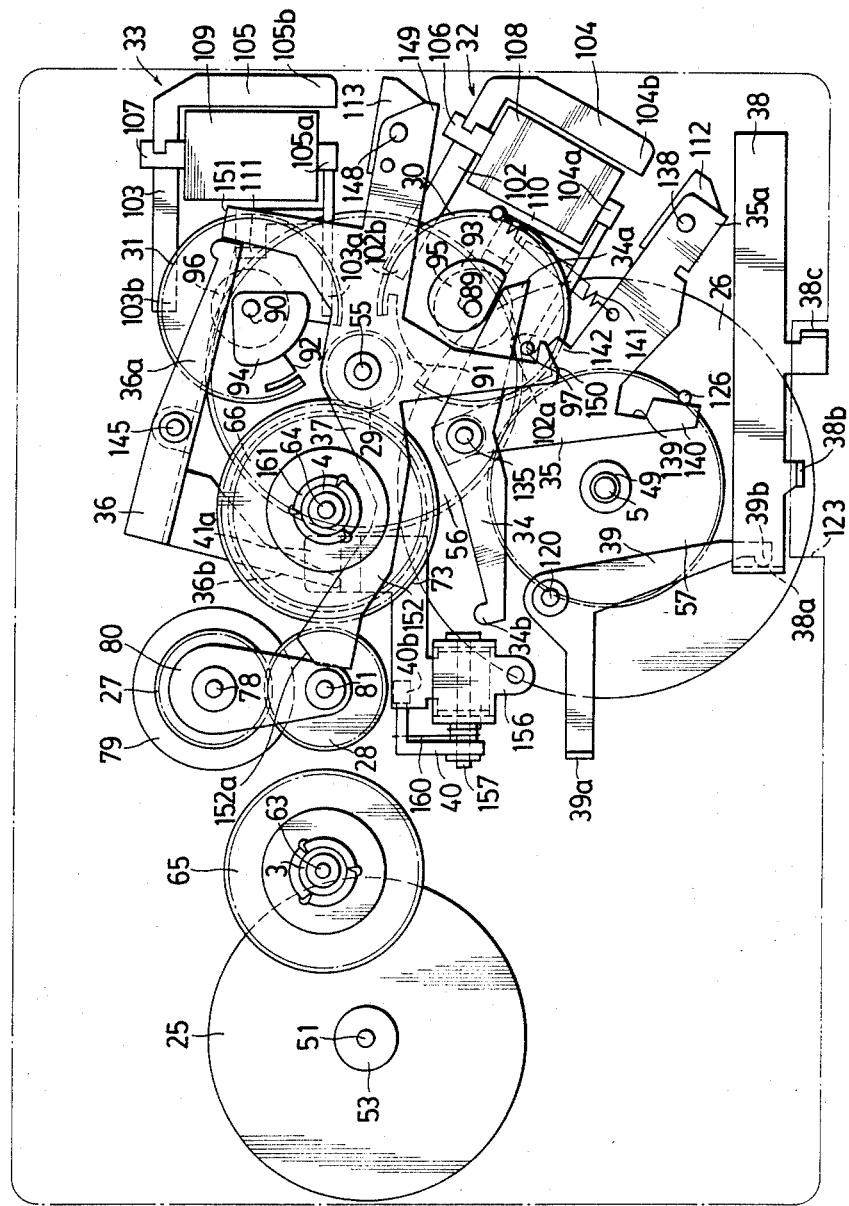
FIG. 3 is a front view of the tape recorder shown in FIG. 1 with the chassis removed.

The tape driving system and the mode changing mechanisms, which are mounted at the rear of the chassis 1, are shown generally in FIGS. 2 and 3. FIG. 2 shows the rear of the chassis 1, while FIG. 3 shows the front of the tape deck with the chassis 1 removed.

A motor 25 is provided for driving both the reel tables 3 and 4 and the capstan 5. The capstan 5 extends rearwardly through the chassis 1 and a flywheel 26 and a flywheel gear 57 are fixed to the rear end of the capstan 5. Reel table shafts 63 and 64 rotatably mount the reel tables 3 and 4, respectively, and extend rearwardly through the chassis 1. A supply reel gear 65 is mounted at the rear end of the shaft 63. A take-up reel main gear 73 and auxiliary gear 66 are mounted at the rear end of the shaft 64. A FF/REW drive gear 27 is rotatably mounted by a shaft 78 on the rear of the chassis 1 at a substantially equal distance from the reel tables 3 and 4. The transfer drive gear 28 is mounted on a shaft 81 carried by a pivot arm 80. The pivot arm 80 pivots about the shaft 78. The transfer drive gear 28 is constantly engaged with the FF/REW drive gear 27 and tends to pivot with rotation of the FF/REW drive gear 27 and thus can selectively engage the supply reel gear 65 and the take-up reel auxiliary gear 66 (see FIGS. 6 and 16B). A main drive gear 29 is mounted to a shaft 55 adjacent to the take-up reel main gear 73 (see FIG. 6). A driving gear 56 is also mounted to the shaft 55 and meshes with the flywheel gear 57 to drive the main drive gear 29 (see FIG. 5). Two changing gears 30 and 31 are also arranged adjacent to the main drive gear 29. The main drive gear 29 drives the changing gears 20 and 31, in a manner described below, to actuate the mode changing mechanisms of the present invention. That general description, and continued reference to FIGS. 1-3, will facilitate an understanding of the structure and operation of the tape driving system and the mode changing mechanisms described in detail below.

Figure 4:
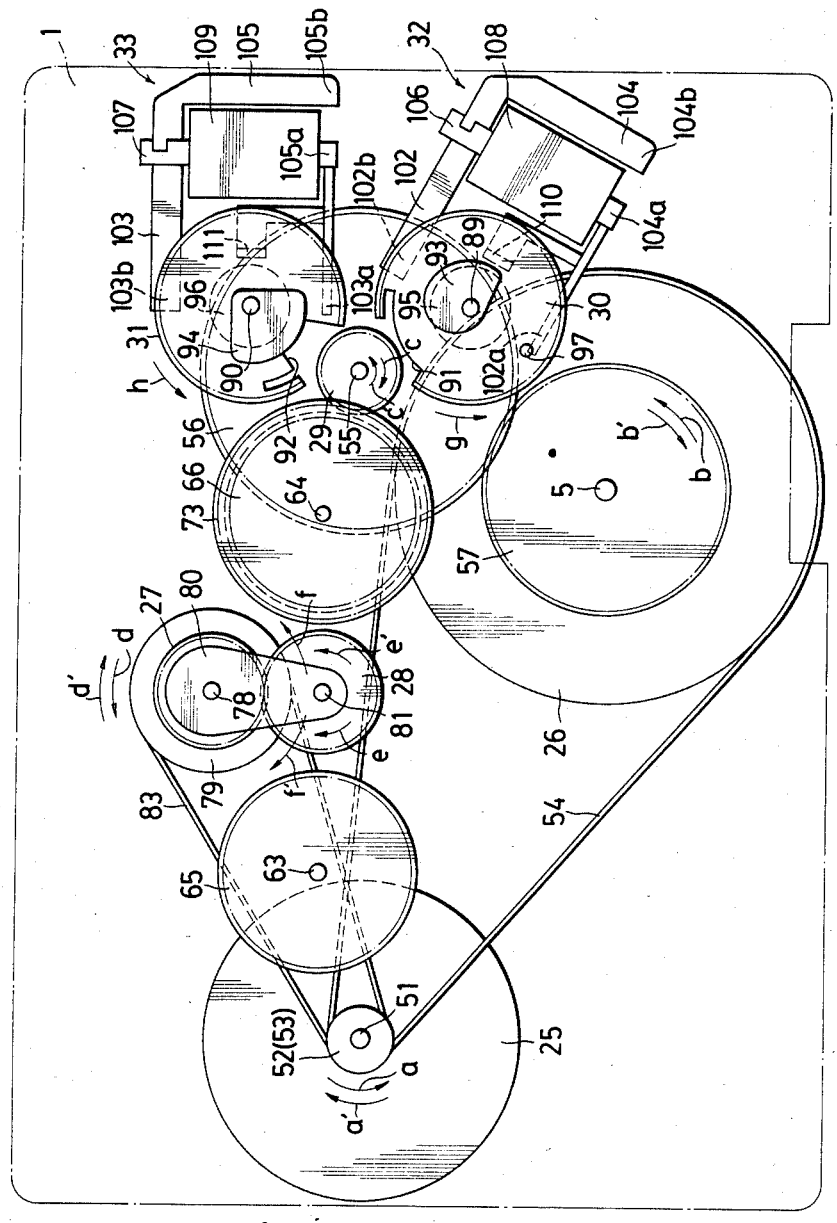
FIG. 4 is a front view, similar to FIG. 3, showing the relationship of various components of the driving mechanisms of the tape recorder shown in FIG. 1.
Figure 5:
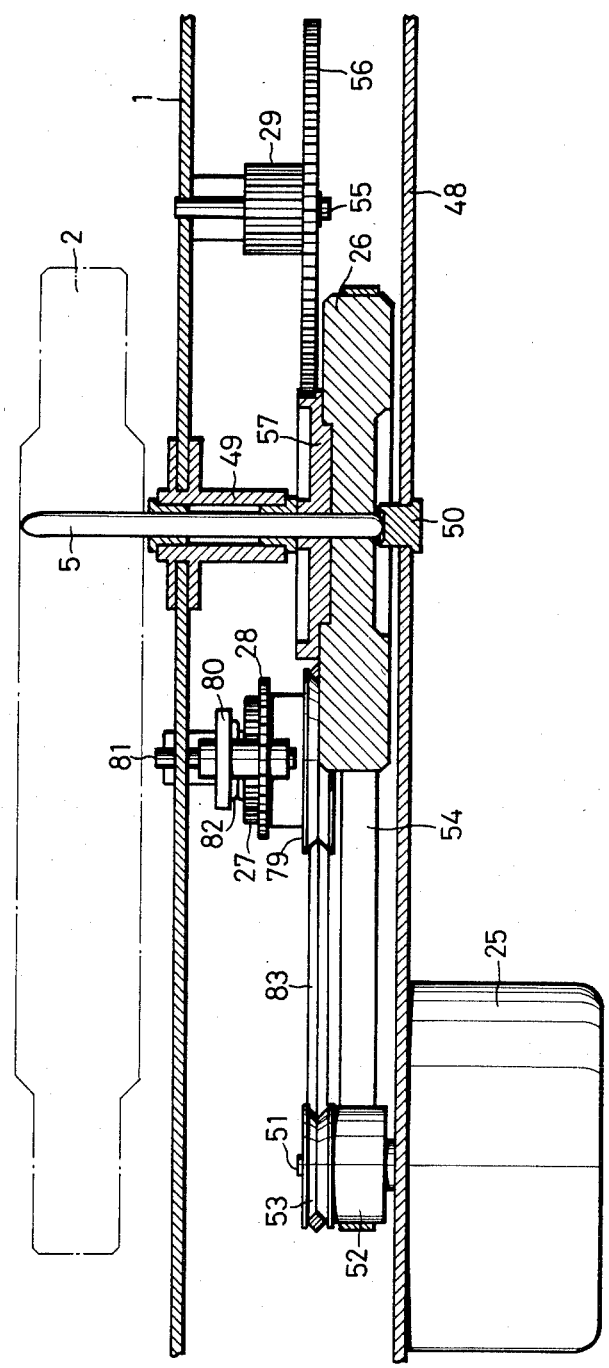
FIG. 5 is a schematic sectional view depicting the relationship between the motor and the main drive gear and the FF/REW drive gear of the tape recorder shown in FIG. 1.

FIGS. 4 and 5 depict details of the FWD drive system.

A subchassis 48 is arranged parallel to and to the rear of the chassis 1. The capstan 5 is rotatably supported in a bearing assembly 49 secured to the chassis 1. The rear end of the capstan 5 is supported by a thrust bearing 50 mounted on the subchassis 48. The motor 25 is mounted to the rear of the subchassis 48. A motor shaft 51 extends through the subchassis 48 and has two pulleys 52 and 53 secured to it at the front of the subchassis 48 and between the chassis 1 and the subchassis 48. A FWD drive belt 54 loops around the main drive pulley 52 and around the outer periphery of the flywheel 26, which is fixed to the capstan 5. The main drive gear 29, which is rotatably mounted on the shaft 55, has the drive gear 56 formed integrally at its rear end. The main drive gear 29 thus is driven whenever the motor 25 is running. When the motor 25 runs in the forward or reverse direction as indicated by the respective arrows a or a' in FIG. 4, the flywheel 26, the capstan 5 and the flywheel gear 57 rotate as indicated by the arrows b or b'. The main drive gear 29 and the driving gear 56 rotate as indicated by the arrows c and c'. When the main drive gear 29 is engaged with the take-up reel main gear 73 and the pinch roller 13 is moved against the capstan 5, the accomplishment of both of which are described below, the tape 19 is driven in the FWD direction.

The FF and REW drive systems are depicted in detail in FIGS. 4–7.

Figure 6:
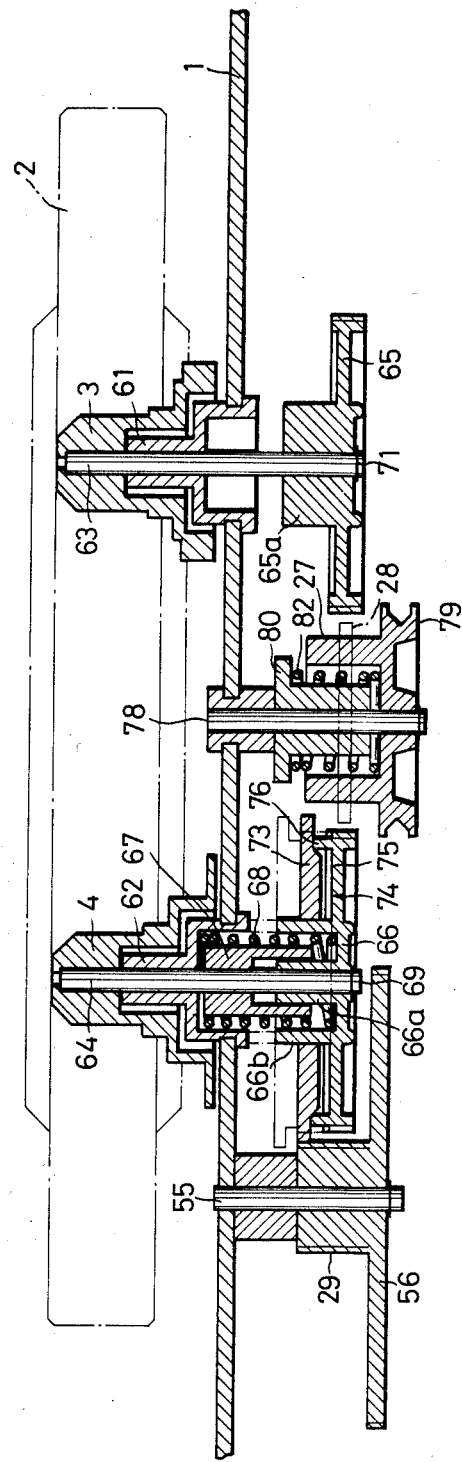
FIG. 6 is a schematic sectional view depicting the relationship between the reel tables and the drive gears of the tape recorder shown in FIG. 1.

As shown best in FIG. 6, the supply reel table 3 and the take-up reel table 4 are fixed to the front ends of the reel shafts 63 and 64, respectively. The reel shafts 63 and 64 are rotatably supported on the chassis 1 by bearings 61 and 62, respectively. The supply reel gear 65 is secured to the rear end of the reel shaft 63 for rotation therewith.

The take-up reel auxiliary gear 66 is movable axially of the reel shaft 64. A sleeve 67 is secured to the reel shaft 64 for for rotation therewith. The take-up reel auxiliary gear 66 includes an integral central boss 66a that telescopes axially with the sleeve 67. However, the inner surface of the sleeve 67 and the outer surface of the central boss 66a both have similar cross-sectional shapes to couple them rotationally. Typically, both have hexagonal cross-sections, although other shapes are possible. In any case, the take-up reel auxiliary gear 66 is movable axially of the take-up reel shaft 64 while torque applied to the take-up reel auxiliary gear 66 is transmitted to the reel shaft 64 through the sleeve 67 and to the take-up reel table 4. A compression spring 68 biases the take-up reel auxiliary gear 66 toward the rear end of the reel shaft 64, where a washer 69 holds it in place. The take-up reel main gear 73 is mounted on a cylindrical portion 66b formed on the take-up reel auxiliary gear 66. The cylindrical portion 66b is formed concentrically with, and radially outside, the spring 68. The take-up reel main gear 73 is freely rotatable relative to the cylindrical portion 66b. A magnetic slip mechanism 74 rotationally couples the take-up reel auxiliary gear 66 and the main gear 73. The take-up reel main gear 73 is magnetized in the direction of its thickness and a hysteresis plate 75 is fixed to the take-up reel auxiliary gear 66 to magnetically couple together the gears 66 and 73. The main gear 73 abuts against a plurality of axial projections 76 formed integrally with the auxiliary gear 66. The projections 76 define a small gap between the main gear 73 and the hysteresis plate 75. Alternatively, the slip mechanism may be mechanical slip mechanism, such as a friction plate of felt or the like interposed between the reel table gears.

Figure 7:
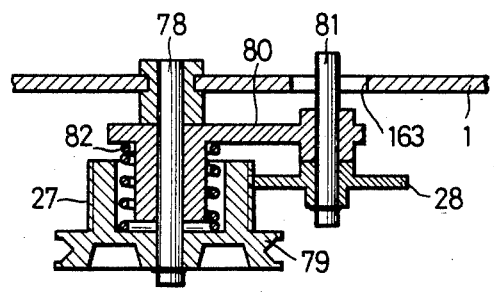
FIG. 7 is a schematic sectional view depicting the relationship between the FF/ REW drive gear and the transfer drive gear of the tape recorder shown in FIG. 1.
Figure 8:
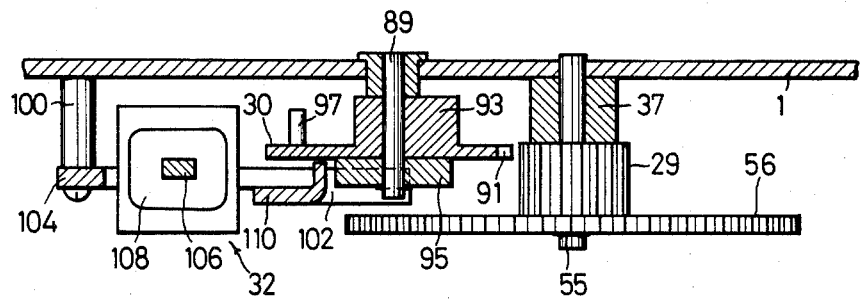
FIG. 8 is a schematic sectional view depicting the relationship between the main drive gear and the first mode changing mechanism and electromagnetic means of the tape recorder shown in FIG. 1.
Figure 9:
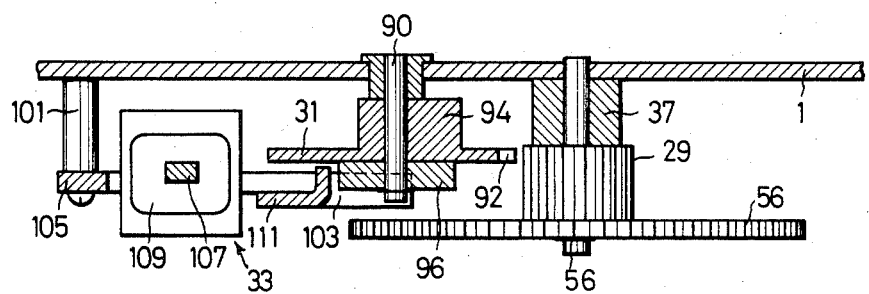
FIG. 9 is a schematic sectional view showing the relationship between the main drive gear and the second mode changing mechanism and electromagnetic means of the tape recorder shown in FIG. 1.

As shown in detail in FIG. 7, the FF/ REW drive gear 27 is rotatably mounted at the rear of the chassis 1 (see FIG. 5) on the shaft 78. A pulley 79 is formed integrally with the FF/ REW drive gear 27. The transfer drive gear 28 is rotatably mounted on the shaft 81, which is fixed to the pivot lever 80. The pivot lever 80 is pivotally supported on and extends radially from the shaft 78 (see also FIG. 4). The transfer drive gear 28 is in constant engagement with the FF/ REW drive gear 27. A compression spring 82 fits between the FF/ REW drive gear 27 and the pivot lever 80.

A belt 83 (see FIGS. 4 and 5) is looped around the pulley 53 on the motor shaft 51 and the pulley 79 of the FF/ REW drive gear 27. When the motor 25 is rotated in the forward or reverse direction indicated by the arrows a and a', respectively, in FIG. 4, the FF/ REW drive gear 27 is driven in the forward or reverse direction indicated by the arrows d and d'. The transfer drive gear 28 is thus rotated in the forward or reverse direction indicated by the arrows e and e'. Rotation of the FF/ REW drive gear 27 causes a moment to act on the pivot lever 80 to pivot it about the shaft 78 in the directions indicated by the arrows f and f'. The compression spring 82 see FIG. 7 acts as a frictional clutch to transmit torque from the FF/ REW drive gear 27 to the pivot lever 80 and to positively couple the pivot lever 80 to the FF/ REW drive gear 27. The transfer drive gear 27 thus can be selectively moved into engagement with the take-up reel main gears 66 and the supply reel gear 65 (see FIG. 6).

The construction of the changing gears 30 and 31 and the electromagnetic means 32 and 33 associated with them is shown in detail in FIGS. 4 and 8–11.

The first and second changing gears 30 and 31 are rotatably mounted, respectively, by pivot pins 89 and 90 fixed to the rear of the chassis 1. As shown in FIG. 4, the changing gears 30 and 31 are near the main drive gear 29. Each changing gear 30 and 31 has a toothless portion 91 and 92, respectively, that prevent the changing gears 30 and 31 from meshing with the drive gear 29 when the toothless portions 91 and 92 are adjacent to the main drive gear 29. Each changing gear 30 and 31 also includes a cam 93 and 94, respectively, formed integrally on the front side of the changing gears. Annular magnets 95 and 96, both of which are magnetized diametrically, are fixed to the rear sides of the changing gears 31 and 32, respectively. A stop pin 97 is formed on the front side of the first changing gear 30.

Figure 10:
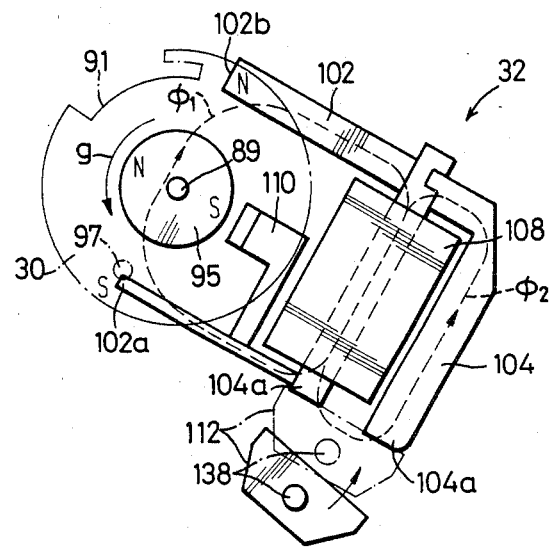
FIG. 10 is a detailed plan view of the first mode changing mechanism, depicted in FIG. 8, and part of the first locking lever that illustrates the operation thereof.
Figure 11:
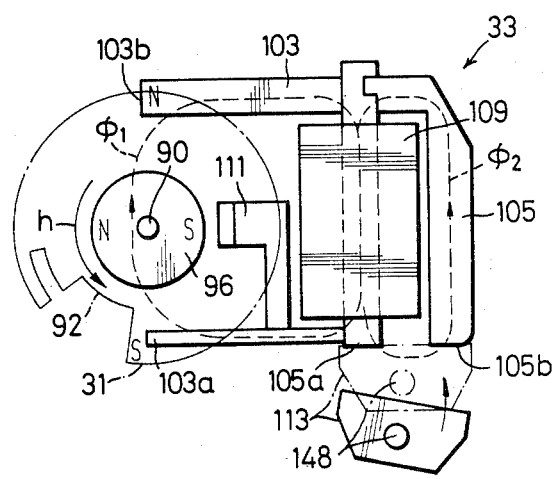
FIG. 11 is a detailed plan view of the second mode changing mechanism, depicted in FIG. 9, and part of the second locking lever illustrates the operation thereof.

The electromagnetic means 32 and 33 are attached to the rear of the chassis 1 by insulating mounts 100 and 101. As shown in FIGS. 10 and 11, the first electromagnetic means 32 includes a first triggering yoke 102 and a first holding yoke 104. The second electromagnetic means 32 includes a second triggering yoke 103 and a second holding yoke 105. The triggering yokes 102 and 103 have legs 102, 102b and 103a, 103b that extend to the sides of the magnets 95 and 96, respectively. The holding yokes 104 and 105 have legs 104a, 104b and 105a, 105b that extend perpendicularly to the legs of the triggering yokes 102 and 103. As shown in FIGS. 10 and 11, the legs 104a and 105a of the respective holding yokes comprise the bight portions connecting the legs of the respective triggering yokes. Solenoid coils 108 and 109 are wound around the bight portions 104a and 105a, respectively. Each triggering yoke 102 and 103 forms a triggering magnetic path $\phi_1$. One triggering magnetic path $\phi_1$ is formed by the legs 102a and 102b, the bight 104a and the magnet 95. Another, independent, triggering magnetic path $\phi_1$ is formed by the legs 103a and 103b, the bight 105a and the magnet 96. Each holding yoke 104 and 105 forms a holding magnetic path $\phi_2$. One holding magnetic path $\phi_2$ is formed by the legs 104a and 104b, the bight connecting them and an armature 112, which moves into contact with the legs 104a and 104b in a manner and for a purpose described below. Another, independent, holding magnetic path $\phi_2$ is formed by the legs 105a and 105b, the bight connecting them and an armature 113, which moves into contact with the legs 105a and 105b. When the armatures 112 and 113 are not in contact with the yokes 104 and 105, the holding magnetic paths $\phi_2$ have higher magneto-resistances than those of the respective triggering magnetic paths $\phi_1$. A first positioning magnet 110 and a second positioning magnet 111 attract the poles of the magnets 95 and 96, respectively, to position the magnets 95 and 96 in the absence of magnetic flux in the triggering magnetic paths $\phi_1$.

In the STOP mode of the tape recorder, the first changing gear 30 does not engage the main drive gear 29 because the toothless portion 91 of the first changing gear 30 faces the main drive gear 29, as shown in FIG. 4. As also shown in FIG. 4, taken with FIGS. 10 and 11, it is the first positioning magnet 110, acting on the magnet 95, that holds the first changing gear 29 at the proper angular position for preventing meshing with the main drive gear 29. When the solenoid coil 108 is energized, substantially no magnetic flux is generated in the second magnetic path $\phi_2$ since because it has a higher magneto-resistance than that of the first magnetic path $\phi_1$. As a result, the legs 102a and 102b first triggering the yoke 102 rotate the magnet 95 in the direction indicated by the arrow g in FIGS. 4 and 10 and thus rotate the first changing gear 30 in the same direction. If the main drive gear 29 is rotating as indicated by the arrow c in FIG. 4, the slight rotation of the first changing gear 30 imparted by the triggering yoke 102 causes the first changing gear 30 to mesh with the main drive gear 29 and be rotated thereby.

The triggering of the second changing gear 31 is performed in the same manner as that of the first changing gear 30. When the solenoid coil 109 of the electromagnetic means 33 is energized, the second changing gear 31 is rotated in the direction indicated by arrow h in FIGS. 4 and 10, and thus meshes with the main drive gear 29.

The first mode changing mechanism, which includes the first changing gear 30 and the triggering means just described, controls the motion of both the head plate 14 and the pinch roller 13 to establish the FWD mode of operation for recording on the tape 19 or playing back material already recorded on the tape.

Figure 12:
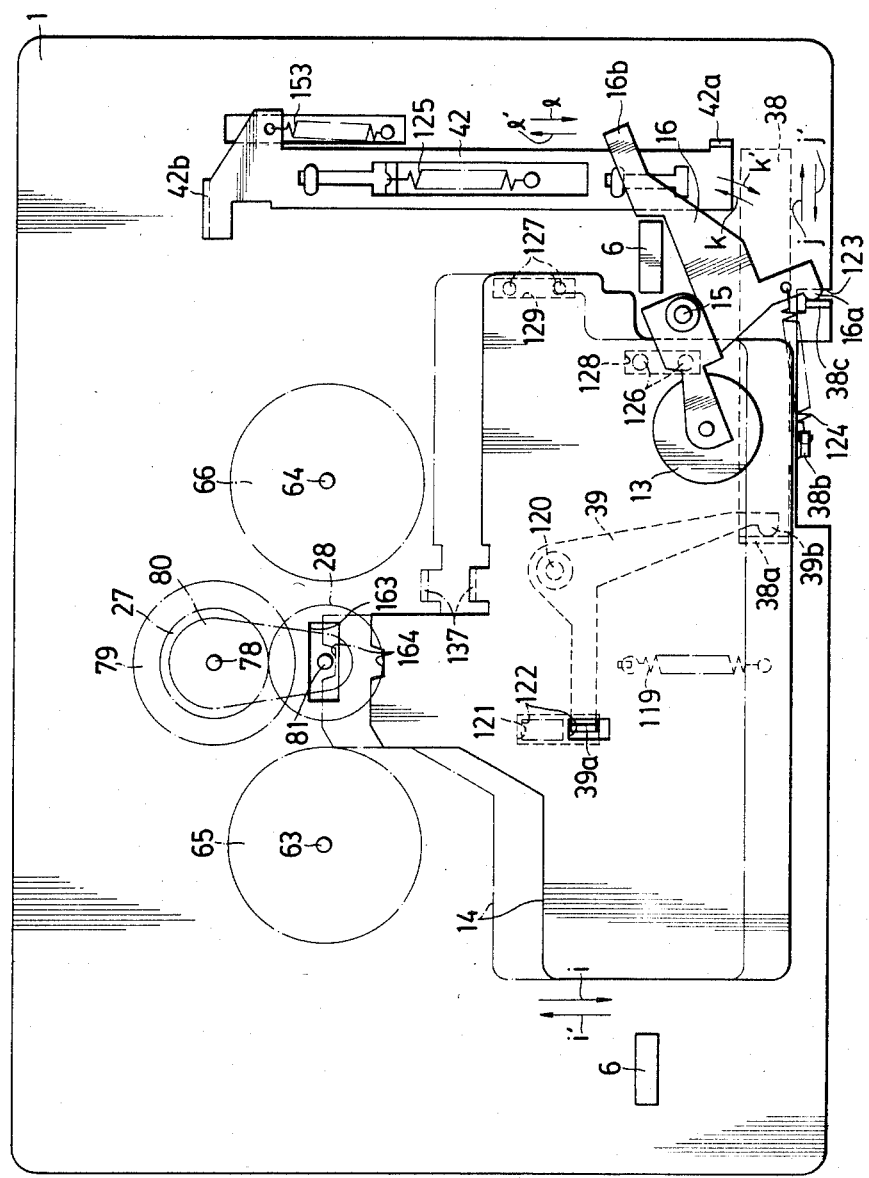
FIG. 12 is a front view of the tape recorder shown in FIG. 1 with the chassis in place and illustrating the position of the head plate.
Figure 13:
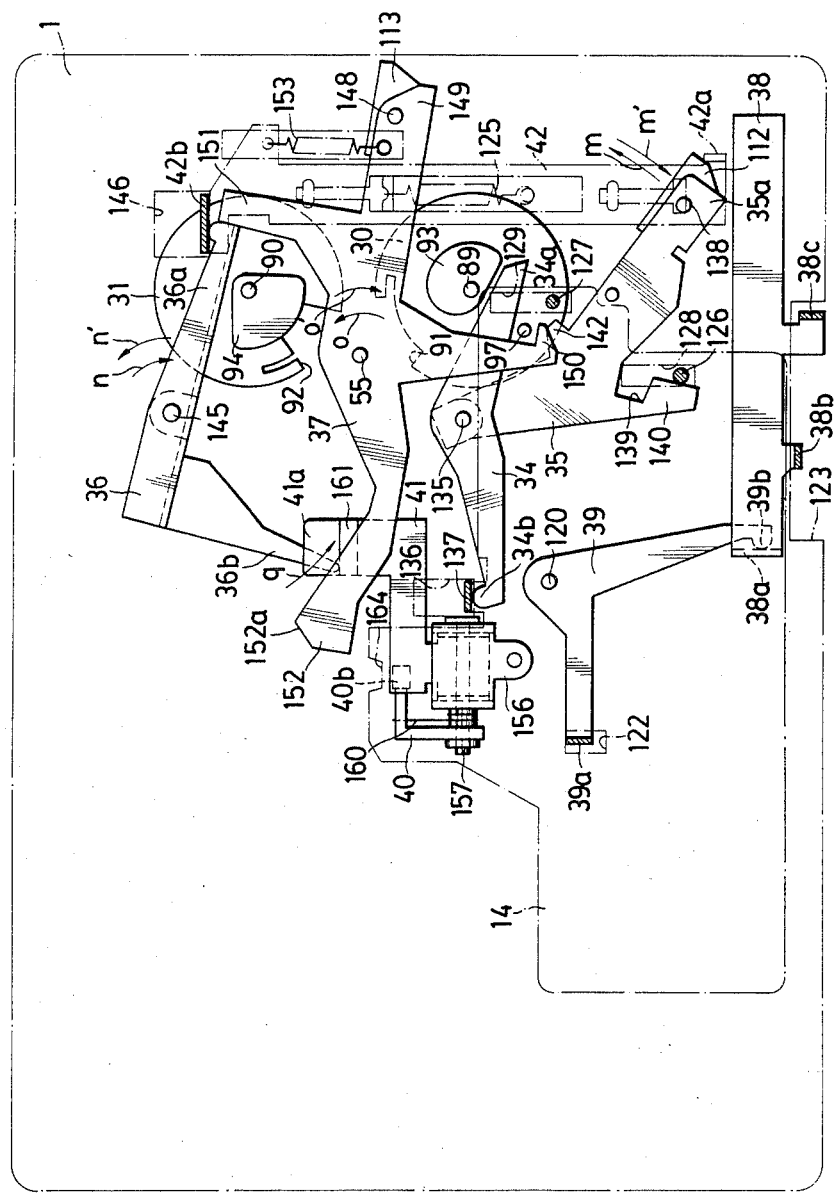
FIG. 13 is a front view of the tape recorder shown in FIG. 1 with the chassis removed showing the lever means changing gears and mode establishing means.

As FIGS. 12 and 13 illustrate, the head plate 14, which is mounted on the front of the chassis 1 to be vertically reciprocal as indicated by the arrows i and i', is biased by a return spring 119 in the direction of the arrow i. A FWD locking pin 126 and an ADS locking pin 127 are fixed on the rear of the head plate 14 and project through the chassis 1 and beyond its rear surface through holes 128 and 129, respectively. FIG. 13, which is a front view that depicts the various lever mechanisms with the chassis 1 and the head plate 14 removed, illustrates the location of the locking pins 126 and 127.

The mode establishing means of the present invention includes a head-pinch roller interlocking lever 39 that is pivotally mounted on a pivot pin 120 fixed to the rear of the chassis 1. The head-pinch roller interlocking lever 39 is substantially L-shaped. The first end 39a of the head-pinch roller interlocking lever 39 is bent up and projects through a hole 121 formed in the chassis 1 and engages within a hole 122 formed in the head plate 14 at the front of the chassis 1. A FWD slider 38 is mounted on the rear of the chassis 1 to be slidable as indicated by the arrows j and j' in FIG. 12. A first end 38a of the FWD slider 38 is bent up and abuts against the second end 39b of the head-pinch roller interlocking lever 39. The pinch roller lever 16 includes a pair of integral arms 16a and 16b. The pinch roller lever 16 is pivotally mounted at the front of the chassis 1 on the pivot pin 15, as described before. The FWD slider 38 also includes projections 38b and 38c formed integrally with the FWD slider 38 and bent up to project beyond the front of the chassis 1 through a notch 123 formed in the edge of the chassis 1 in FIG. 2. A tension spring 124 (not shown in FIG. 13) extends between the arm 16a on the pinch roller lever 16 and the projection 38b on the FWD slider 38 to urge the end of the arm 16a against the projection 38c. The length of the moment arm between the pivot pin 15 and the point at which the spring 124 acts on the arm 16a and the pivot pin 15 is longer than that between the end of the arm 16a and the projection 38c. As a result, the force of gravity on the pinch roller 13, which urges the pinch roller lever 16 to rotate as shown by the arrow k in FIG. 12, also urges the FWD slider 38 in the direction of the arrow. Alternately, a spring could be used to bias the FWD slider 38.

A pause slider 42 is mounted on the front of the chassis 1 to be slidable as shown by the arrows 1 and 1' in FIG. 12. The pause slider 42 is biased in the direction of the arrow by a spring 125. The end of the arm 16b of the pinch roller lever 16 is positioned to abut against a projection 42a formed integrally with and bent up from the lower portion of the pause slider 42. A spring 125 connected between the pause slider 42 and the chassis 1 biases the pause slider 42 in the direction of the arrow 1' in FIG. 12.

Figure 14:
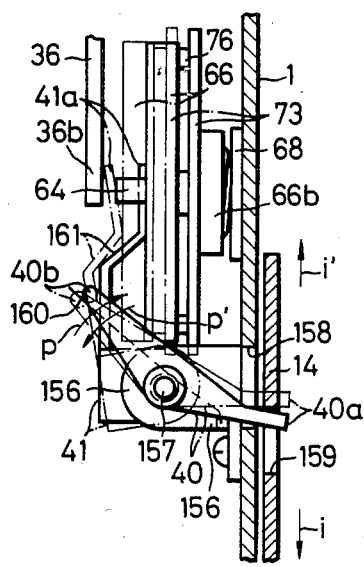
FIG. 14 is a schematic sectional view depicting the operation of the engagement lever and the pusher lever of the mode establishing means shown in FIG. 13.
Figure 15:
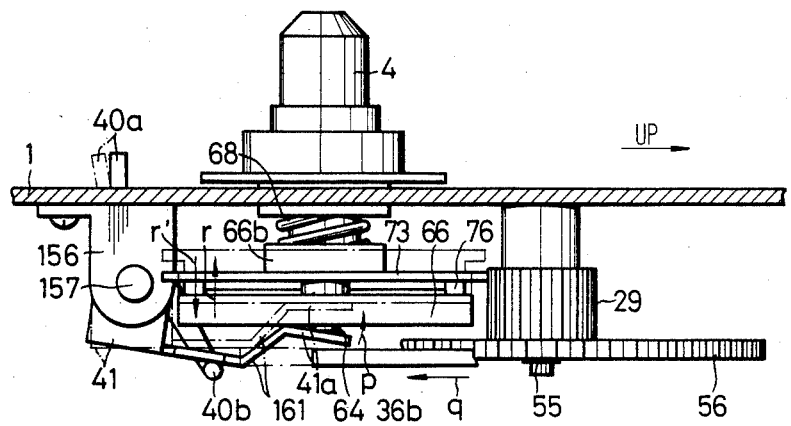
FIG. 15 is a schematic sectional view illustrating the operation of the engagement lever and the second actuating lever shown in FIG. 13.

FIGS. 13-15 depict the details of the lever means of the mode changing apparatus of the present invention. The first mode changing mechanism includes a first actuating lever 34 that is pivotally mounted on a pivot pin 135 fixed to the rear of the chassis 1. The first end 34a of the FWD lever 34 abuts against the cam 93 on the first changing gear 30. The other end 34b on the first actuating lever 34 abuts against a projection 137 which is formed integrally with, and near the central portion of the upper edge of, the head plate 14. The projection 137 is bent up from the head plate 14 and extends through a hole 136 in the chassis 1 to project beyond the rear of the chassis 1 and into contact with the first end 34b of the actuating lever 34.

The mode changing apparatus of the present invention includes a first locking lever 35 that is also pivotally mounted on the pivot pin 135. The armature 112 (see FIG. 10) is mounted on the holding end 35a of the first locking lever 35 by a pin 138 so that the armature 112 is pivotal through a small, predetermined arc. The first locking lever 35 includes an integral locking arm 140 that has a recess 139 for hooking around the FWD locking pin 126 on the head plate 14. The first locking lever 35 is biased by a spring 141 (see FIG. 3) as shown by the arrow m in FIG. 13. The angular position of the first locking lever 35 is determined by the abutment of the locking arm 140 against the FWD locking pin 126. A finger 142 on the first locking lever 35 cooperates with the pin 97 on the first changing gear 30 in a manner described in detail below.

A second actuating lever 36 that is pivotally mounted on a pivot pin 145 fixed to the rear of the chassis 1 forms a part of the second changing mechanism. The second actuating lever 36 is substantially L-shaped, with an arm 36a that abuts against the cam 94 on the second changing gear 31. A projection 42b, which is bent up from the pause slider 42 on the front of the chassis 1, extends through a hole 146 formed in the chassis 1 to project beyond the rear of the chassis 1. The end of the arm 36a abuts against the projection 42b on the pause slider 42. Thus, the second actuating lever 36 is urged in the direction of the arrow n in FIG. 13 by the spring 125 of the pause slider 42 to rest against the cam 94.

The mode changing apparatus of the present invention includes a second locking lever 37 that is pivotally mounted on the shaft 55 fixed to the rear of the chassis 1. A holding arm 149 on the second locking lever 37 has the armature 113 (see FIG. 11) mounted thereto by a pin 148 so that armature 113 is pivotal through a small, predetermined arc. The second locking lever 37 also includes a locking hook 150 for cooperating with the ADS locking pin 127 on the head plate 14. The second locking lever 37 also includes a follower arm 151 that extends toward the end 36a of the second actuating lever 36 and passes adjacent to the cam 94 for cooperation with both. Finally, the second locking lever 37 includes a positioning arm 152. The second locking lever 37 is biased in the direction of the arrow o in FIG. 13 by a spring 153 which spans the second locking lever 37 and the pause slider 42. The spring 153 passes through a elongated hole in the chassis 1 between the locking lever 37 at the rear of the chassis 1 and the pause slider 42 at the front. Thus, the second locking lever 37 is angularly positioned by the abutment of the end of the follower arm 151 against the end of the arm 36a of the second actuating lever 36.

The mode establishing means includes an engagement lever 40 that is pivotally mounted on a pivot pin 157 on a bracket 156 fixed to the rear of the chassis, which is seen from the side in FIGS. 14 and 15. One end 40a of the engagement lever 40 projects beyond the front of the chassis 1, through a hole 158 formed therein, and engages a cutout 159 in the head plate 14. The interacting lever 40 is biased in the direction of the arrow p in FIGS. 14 and 15 by a torsion spring 160.

A pusher lever 41 comprises a leaf spring that is pivotally mounted on the pivot pin 157. The pusher lever 41 has an offset portion 41a in contact with the take-up reel auxiliary gear 66. An inclined camming surface 161 connects the offset portion 41a with the main portion of the pusher lever 41. The second actuating lever 36 includes pusher arm 36b (see also FIG. 2) that contacts the pusher lever 41 for cooperation with the inclined camming surface 161 as shown by the arrow g in FIG. 15. A second end 40b of the engagement lever 40 engages the pusher lever 41 and the torsion spring 160 holds the engagement lever 40 against the pusher lever 41. As shown in FIGS. 5 and 12, one end of the shaft 81 of the shaft lever 80 extends beyond the front of the chassis 1 through a hole 163 formed therein. A notch 164 for engaging the front end of the shaft pin 81 is formed in the upper edge of the head plate 14.

The operation of the present invention in establishing and changing the modes of the tape deck is illustrated in FIG. 16-19.

Figure 19A:
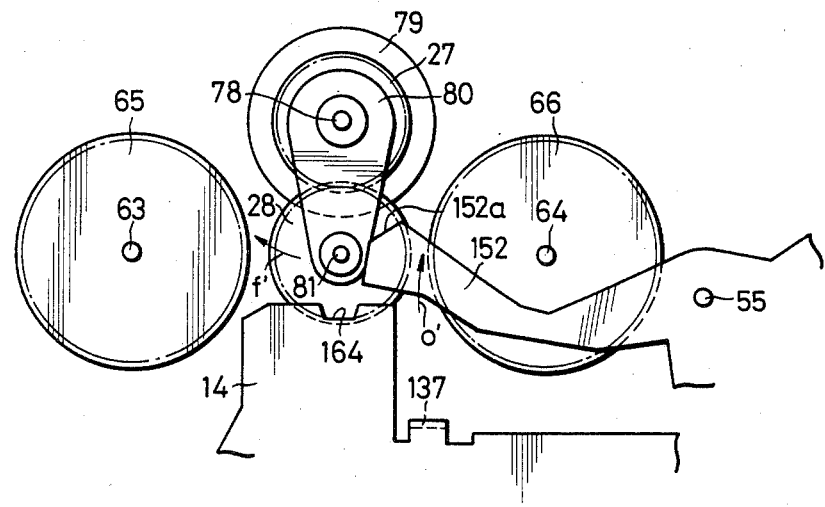
FIGS. 19A to 19D are detailed plan views that illustrate the operation of the transfer drive gear by the second locking lever of the tape recorder shown in FIG. 1.

STOP Mode. In the STOP mode, for which FIGS. 3 and 4 depict the positions of the parts of the tape deck, changing gears 30 and 31 are both disengaged from the main drive gear 29. The cams 93 and 94 are positioned at the locations shown in FIGS. 17A and 18A relative to the first actuating lever 34 and the second actuating lever 36, respectively. In the STOP mode, as shown in FIG. 19A, the end 152a of the positioning arm 152 of the second locking lever 37 abuts the pivot lever 80 to position the transfer drive gear 28 and prevent it from engaging the take-up reel auxiliary gear 66.

Figure 16A:
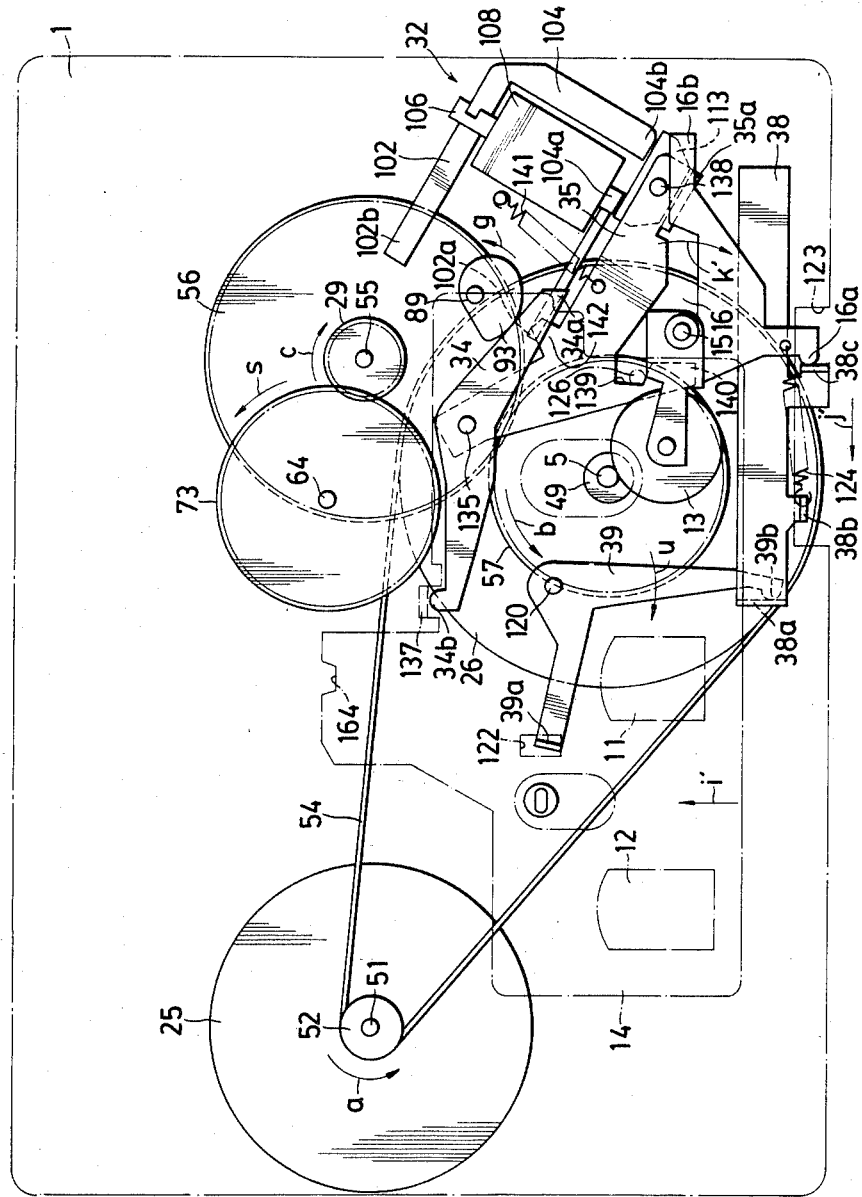

FWD Mode. When the FWD mode button is depressed while the tape recorder is in the STOP mode, the motor 25 is energized in the forward direction, shown by the arrow a in FIG. 4, and the solenoid coil 108 for the electromagnetic means 32 is energized. FIG. 16A generally depicts the relevant parts of the tape recorder moving into the FWD mode.

When the motor 25 is driven in the forward direction, the capstan 5 is rotated in the direction indicated by the arrow b in FIG. 16A, and the main drive gear 29 is rotated, through the flywheel gear 57 and the driving gear 56, in the direction indicated by the arrow c (see also FIGS. 4 and 5).

Figure 19B:
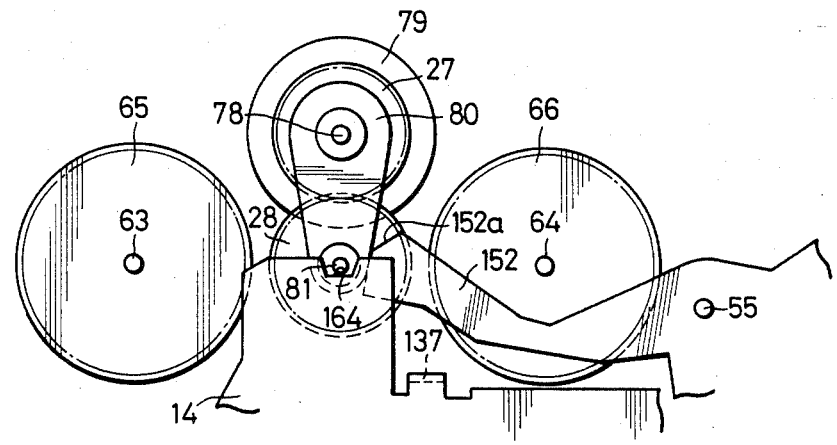

In the FWD mode, the FF/REW drive gear 27 is rotated in the direction indicated by the arrow d in FIG. 4. Therefore, the pivot lever 80 is urged in the direction of the arrow f in FIG. 4. But because the end 152a of the positioning arm 152 of the second locking lever 37 is in contact with the pivot lever 80, the transfer drive gear 28 cannot engage the take-up reel auxiliary gear 66 (see FIG. 3). In the FWD mode, the head plate 14 has been moved to its operative position, depicted in FIGS. 12 and 16a, in a manner described just below. As shown in FIGS. 12 and 19B, the notch 164 in the head plate 14 engages with the end of the shaft 81 also to prevent the transfer drive gear 28 from engaging with the take-up reel auxiliary gear 66.

Figure 17A:
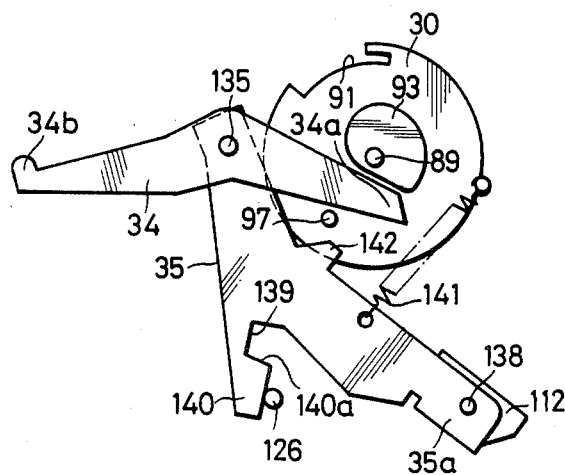
FIGS. 17A to 17C are detailed plan views that illustrate the operation of the first changing mechanism and the first locking lever of the tape recorder shown in FIG. 1.
Figure 17B:
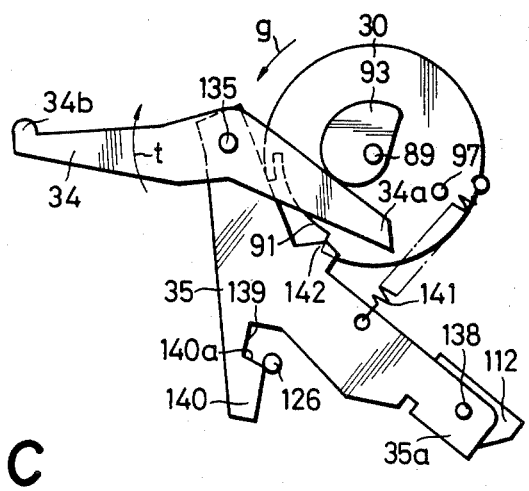
Figure 17C:
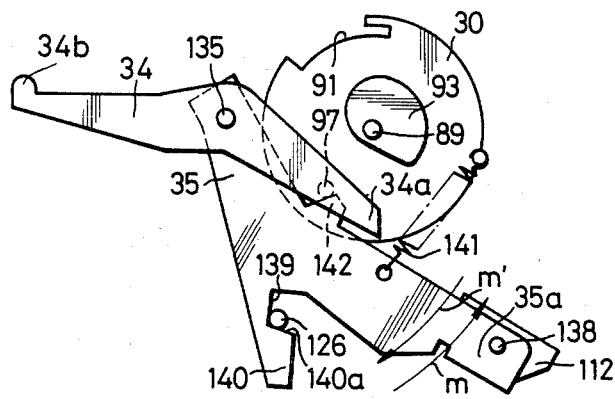

Energizing the solenoid coil 108 triggers rotation of the first changing gear 30 in the direction of the arrow g in FIG. 4 and to mesh with the main drive gear 29, as described above in connection with FIG. 10. The cam 93 thus is also rotated, as shown in FIGS. 17B and 17C. The first actuating lever 34 is pivoted by the cam 93 in the direction indicated by arrow t, which translates the head plate 14 in the direction of the arrow i' (see FIG. 16A) toward its operative position. When the head plate 14 reaches its operative position, the first locking lever 35 is permitted to pivot in the direction of the arrow m in FIG. 17C. The FWD locking pin 126 of the head plate 14 then enters the recess 139 of the locking arm 140 to lock the head plate 14 in its operative position. In that position, the transducer heads 11 and 12 occupy their fully operational positions shown in FIG. 1 by dot-dash lines.

As the first FWD locking lever 35 pivots in the direction of the arrow m, the armature 112 moves toward the legs 104a and 104b of the holding yoke 104 (see FIG. 10). When the head plate 14 is locked in its operative position by the locking arm 140 of the first locking lever 35, the armature 112 is magnetically held against the arms 104a and 104b of the holding yoke 104 as shown in FIG. 16A. The first locking lever 35 thus holds the head plate 14 in its operative position.

When the first changing gear 30 has completed a single rotation, the stop pin 97 on the first changing gear 30 contacts the finger 142 on the first locking lever 35, which has been moved into the path of the stop pin 97 by virtue of the rotation of the lever 35 in the direction of the arrow m as described above. As a result, the first changing gear 30 is positively stopped at a position where it will not remesh with the main drive gear 29. The changing gear 30 is thus prevented from overrotation by its own inertia in the direction of the arrow g.

Since the head plate 14 is moved in the direction of the arrow i', as shown in FIG. 14, the engagement lever 40 is pivoted in the direction indicated by the arrow p' against the biasing force of the torsion spring 160. Then, as indicated by the solid lines in FIG. 15, the take-up reel gears 66 and 73 are moved in the direction of the arrow r' by the biasing force of the spring 68 (see FIG. 6). The take-up reel main gear 73 thus meshes with the main drive gear 29. As a result, the torque of the main drive gear 29 is transmitted to the take-up reel main gear 73 and, through the magnetic slip mechanism 74, to the take-up reel auxiliary gear 66 through the magnetic slip mechanism 74 (see FIG. 6 and the accompanying description above). In that manner, the take-up reel table 4 and the take-up reel hub 18 of the cassette are rotated in the direction indicated by the arrow s in FIG. 16A.

Since the head plate 14 is moved in the direction indicated by the arrow i' as shown in FIG. 16A, the head-pinch roller interlocking lever 39 is pivoted in the direction of the arrow u. The FWD slider 38 is slid in the direction of the arrow j' and the pinch roller lever 16 is pivoted in the direction of the arrow k' by the spring 124 until it pinches the tape 19 against the capstan 5 (see also FIG. 1) to drive the tape. The tape 19 is thus driven at the normal speed in the direction of the arrow v to perform the desired recording or reproduction while it is taken up by the take-up reel of the cassette 2.

FF Mode. If the FF mode button is depressed while the tape recorder is in its STOP mode, the motor 25 is driven in the forward direction indicated by the arrow a in FIG. 4, just as it is when the FWD button is pressed. However, pressing the FF button energizes the solenoid coil 109 for the electromagnetic means 33, instead of the solenoid coil 108.

When the motor 25 is driven in the direction indicated by the arrow a in that manner, the FF/ REW drive gear 27 is rotated in the direction of the arrow d and torque is applied to the pivot lever 80 in the direction of the arrow f as shown in FIG. 16B. The spring clutch arrangement described in connection with FIG. 6 transmits the rotational force on the pulley 79 to the pivot lever 80.

Figure 18A:
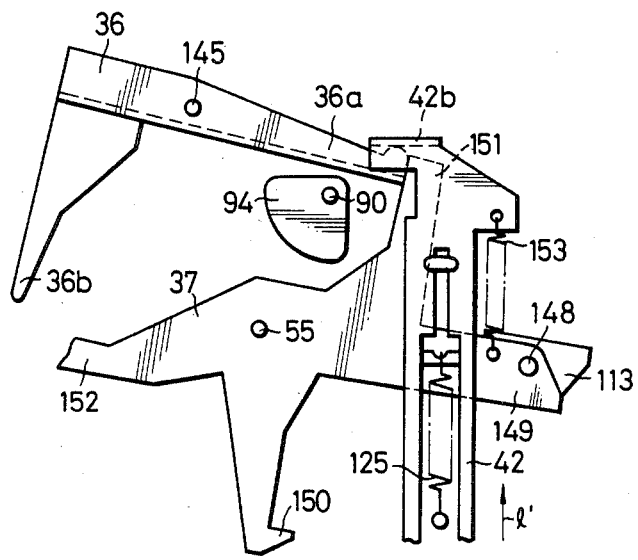
FIGS. 18A to 18D are detailed plan views that illustrate the operation of the second changing mechanism and the second locking lever of the tape recorder shown in FIG. 1.
Figure 18B:
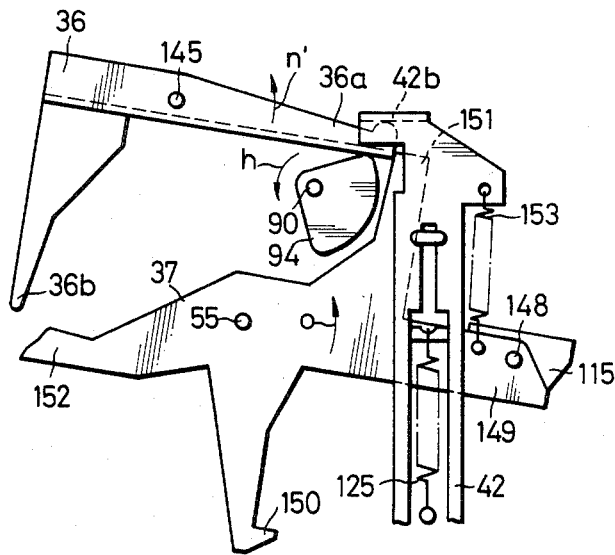
Figure 18C:
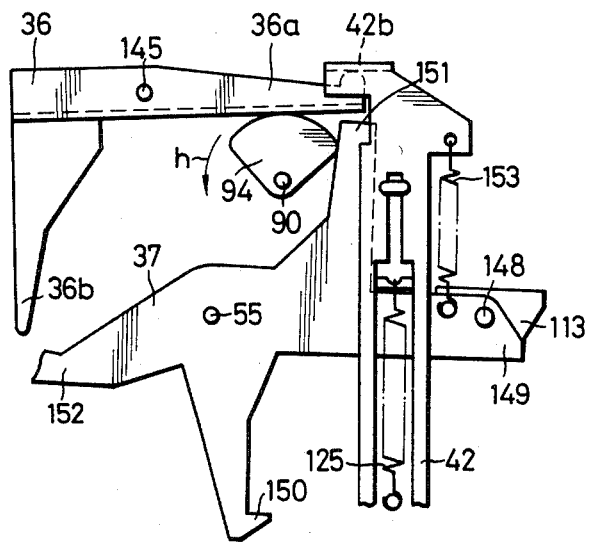
Figure 18D:
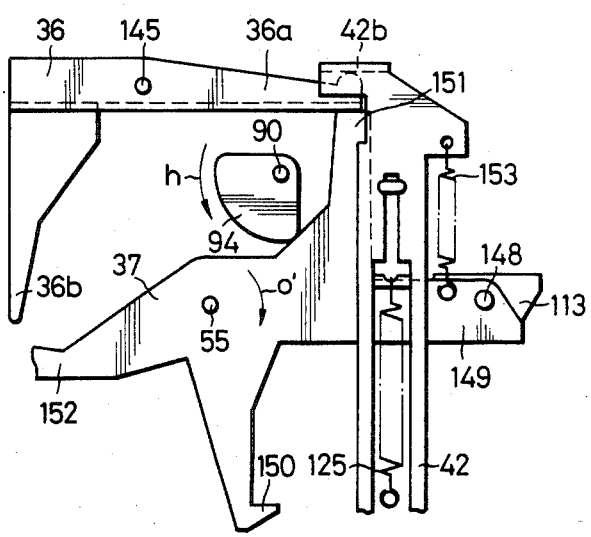

When the solenoid coil 109 is energized, initial rotation of the second changing gear 31 is triggered in the direction of the arrow h in FIGS. 4 and 11, whereby the toothed portion of the second changing gear 31 engages the main drive gear 29. Thereafter, the main drive gear 29 rotates the changing gear 31 and the cam 94 as shown in FIGS. 18B to 18D. The cam 94 pivots the second actuating lever 36 in the direction of the arrow n'. The end of the arm 36a of the second actuating lever 36 pushes the pause slider 42 in the direction of the arrow 1' against the biasing force of the spring 125. When the end of the arm 36a of the second actuating lever 36 releases the end of the follower arm 151 of the second locking lever 37, the second locking lever 37 rotates in the direction of the arrow o (see FIG. 18B) until the follower arm 151 rests against the cam 94 (see FIG. 18C).

Figure 16C:
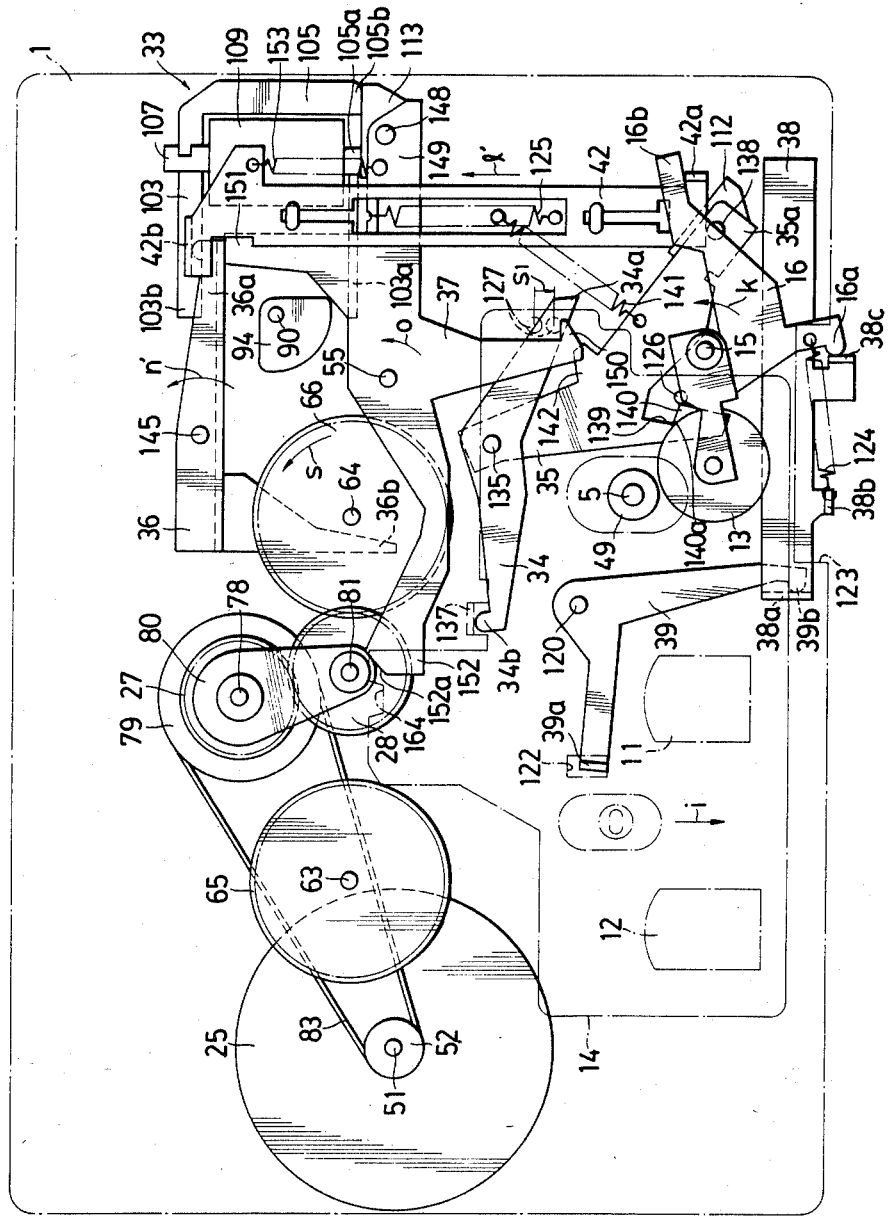

When the second actuating lever 36 is pivoted in the direction of the arrow n', as indicated by the dot-dash line in FIG. 16C, the end of the pusher arm 36b of the second actuating lever 36 is urged against the inclined camming surface 161 of the pusher lever 41 in the direction of the arrow q. The inclined camming surface 161 causes the pusher lever 41 to pivot in the direction of the arrow p in FIG. 15. The take-up reel gears 66 and 73 are moved in the direction of the arrow r to the position indicated by the dot-dash lines in FIG. 15 against the force of the spring 68. Accordingly, the take-up reel main gear 73 is disengaged from the main drive gear 29.

In practice, in the STOP mode, the engagement lever 40 is positioned by the torsion spring 160 into the location indicated by the solid lines in FIG. 14. The pusher lever 41 holds the take-up reel gears 66 and 73 at the positions between the position indicated by the solid lines (the FWD position) and the position indicated by the dot-dash lines (FF/ REW position) in FIG. 15. Then, to go into the FF mode from the STOP mode, the take-up reel gears 66 and 73 are moved only slightly in the direction indicated by arrow r in FIG. 15 by the second actuating lever 36. The take-up reel auxiliary gear 66 is wide enough to engage with the transfer drive gear 28 even if the take-up reel table gears 66 and 73 move slightly.

Figure 19C:
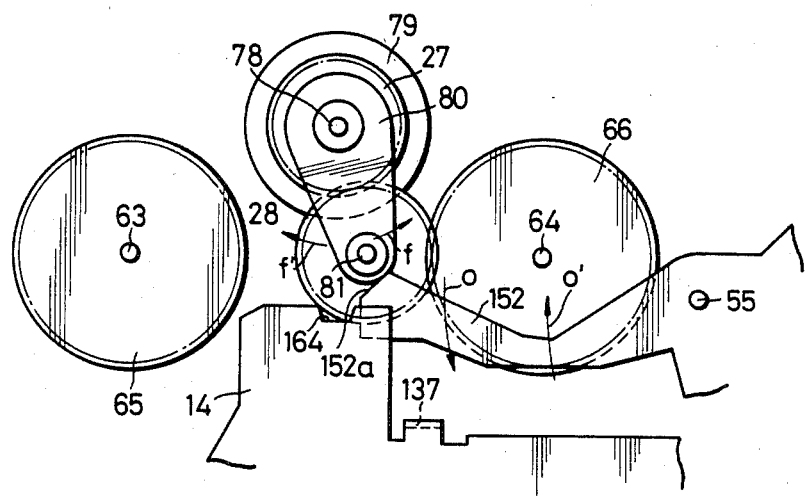

In any case, when the second locking lever 37 is pivoted in the direction of the arrow o in FIG. 18B, the positioning arm 152 of the second locking lever 37 moves away from the pivot lever 80, as shown in FIG. 19C. The pivot lever 80 thus pivots in the direction of the arrow f, as shown in FIGS. 16B and 19C, and the transfer drive gear 28 meshes with the take-up reel auxiliary gear 66 (see also FIG. 6).

As the second locking lever 37 pivots in the direction of the arrow o, the armature 113 is moved toward the legs 105 and 105b of the second holding yoke 105 (see FIG. 11). The second locking lever 37 is thus held at the position shown in FIG. 18D.

When the second changing gear 31, which has been rotating in the direction of the arrow h during the setting of the FF mode, approaches its rest position, the follower arm 151 of the second locking lever 37 has been stopped by the armature 113 coming to rest against the second holding yoke 105. The follower arm 151 thus positively stops further rotation of the gear 31 because the cam 94 hits the follower arm 152. Consequently, the second changing gear 31 is forcibly stopped at its rest position, so that it will not re-engage the main drive gear 29 because of its rotational inertia.

As indicated by the solid line in FIG. 16B, the transfer drive gear 28 rotates the take-up reel table 4 at a high speed in the direction of the arrow s. Thus, the tape 19 in the cassette 2 is fast forwarded in the direction indicated by arrow v in FIG. 1. Of course, the head plate 14 and the pinch roller 13 remain in their STOP mode positions.

REW mode. When the REW mode button is depressed while the tape recorder is in its STOP mode, neither of the solenoid coils 108 and 109 is energized.

The motor 25 is rotated in the reverse direction, as shown by the arrow a' in FIG. 4. As shown by the dot-dash lines in FIG. 16B, the FF/ REW drive gear 27 rotates in the direction of the arrow d'. The pivot lever 80 is thus pivoted in the direction of the arrow f'. The transfer drive gear 28 engages the supply reel gear 65 and rotates it at high speed in the direction of the arrow s', rewinding the tape 19 in the cassette 2 in the direction of the arrow v' in FIG. 1. The head plate 14 and the pinch roller lever 13 remain in their STOP mode positions.

ADS Mode. The tape deck can also be operated in an "Automatic Detection of Silence" (ADS) mode. That mode may be established by depressing the push-button for the mode or the mode during a playback operation in the mode to cause rapid advance of the tape to a desired interval between recorded passages, at which playback or reproducing can again be started.

More specifically, if the FWD mode button and the FF mode button are simultaneously depressed, the FWD mode is set first. In the FWD mode, the motor 25 is driven in the forward direction shown by the arrow a, the solenoid coil 108 is energized, and the head plate 14 is locked by the first locking lever 35 at the operative position shown in FIG. 16A. The establishment of the FWD mode from the STOP mode is described in detail above.

Subsequently, as was described above in connection with the establishment of the FF mode from the STOP mode, the solenoid coil 109 for the electromagnet 33 is energized. The second actuating lever 36 and the locking lever 37 are pivoted in the directions of the arrows n' and o, respectively, as shown in FIG. 16C. The take-up reel table 4 is rotated by the transfer drive gear 28 at a high speed in the direction indicated by the arrow s (see FIG. 16C), and the second locking lever 37 is held by the second holding yoke 105.

After a short delay from the energization of the second solenoid coil 109, the first solenoid coil 108 is deenergized. The first holding yoke 104 thus releases the armature 112. The FWD locking pin 126 on the head plate 14 pushes against the inclined surface 140a on the locking arm 140, and thus rotates the first locking lever 35 in the direction of the arrow m' in FIG. 17C. Then the head plate 14, which has been locked in its operative position, moves in the direction of the arrow i by the force of the spring 119.

The head plate 14 moves until the ASD locking pin 127 occupies the position indicated by the dashed lines in FIG. 16C in which it comes to rest against the locking hook 150 of the second locking lever 37. In other words, the ADS locking pin 127 moves by a stroke S1, as shown in FIG. 16C, until it hits the locking hook 150, so that the head plate 14 is locked again at that position. When the head plate 14 moves by the stroke S1, the recording/reproducing head 11 is withdrawn from the tape 19 as indicated by the intermediately located, uniformly dashed lines in FIG. 1. In that position light contact between the recording/reproducing head 11 and the tape 19 is maintained.

Because the second actuating lever 36 has been pivoted in the direction of the arrow n', the pause slider 42 has been slid against the biasing force of the spring 125 and thus moved in the direction of the arrow l' by the arm 36a. As a result, the pinch roller lever 16 is pivoted against the biasing force of the spring 124, in the direction of the arrow k, by the tab 42a on the pause slider 42. The pinch roller 13 is thus slightly separated from the capstan 5 as shown by the uniformly dashed lines in FIG. 1.

As a result, the tape 19 in the cassette 2 can be fast-forwarded in the direction of the arrow v while the signals recorded thereon are reproduced by the recording/reproducing head 11.

When the FWD and REW mode buttons are simultaneously depressed, the same sequence occurs as when the FWD and FF mode buttons are simultaneously depressed. However, the motor 25 is not immediately energized while the FWD positions of the head plate 14 and the pinch roller 13 are being established. Instead, the motor 25 is, after a short delay to allow establishment of those positions, driven in the reverse direction as indicated by the arrow a' in FIG. 16C. Thus, the tape 19 in the cassette 2 is rewound in the direction indicated by the arrow v' in FIG. 1 while the signals thereon are reproduced by the recording/reproducing head 11.

As those skilled in the art will realize, a suitable logic circuit will be required to regulate the sequences in which the various elements are energized and deenergized to establish the FF/ADS and REW/ADS modes. The design of such a logic circuit is well within the skill of the art and is therefore not described herein.

Figure 16D:
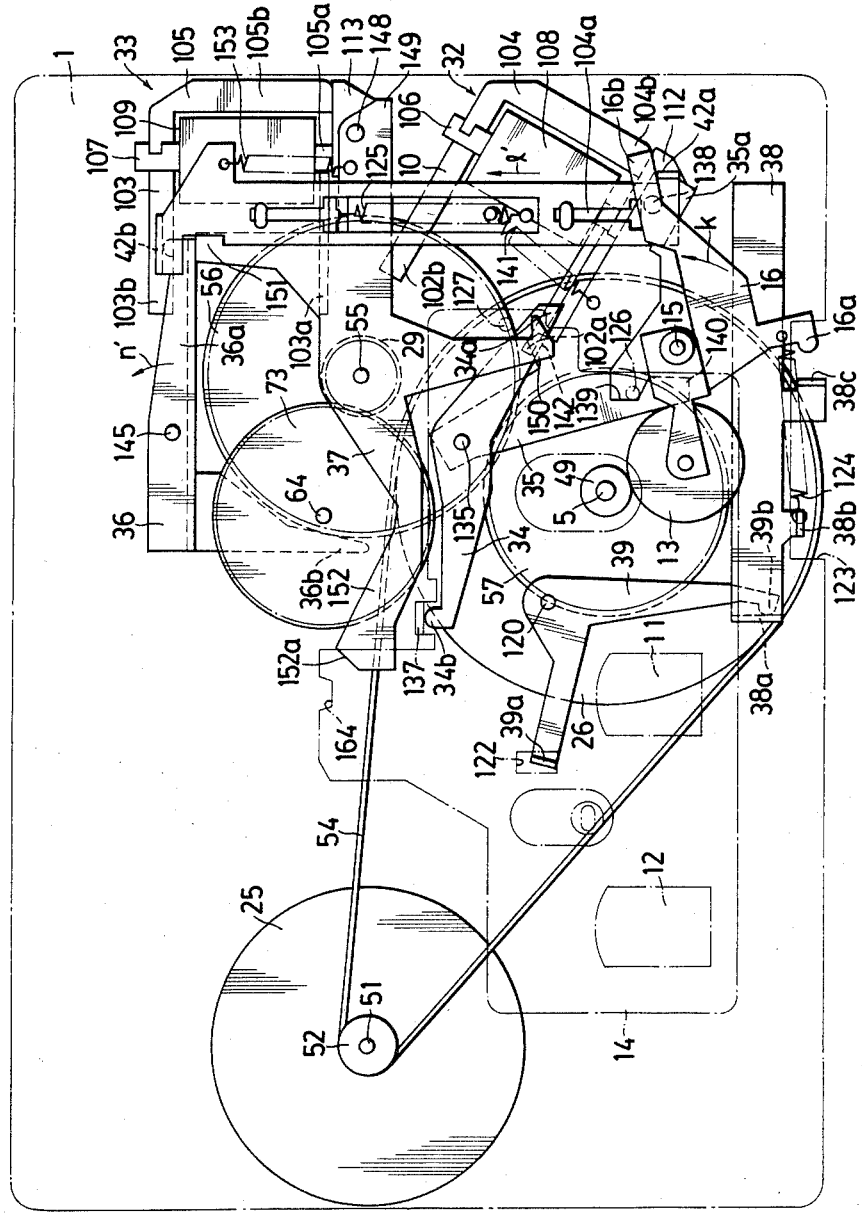

PAUSE Mode. A PAUSE mode can be established while the recorder is in the FWD mode. When a PAUSE button is depressed, the solenoid coil 109 is energized. As shown in FIG. 16D, the head plate 14 is locked in its operative position, while the pinch roller lever 16 is pivoted in the direction indicated by arrow k by the sliding movement of the pause slider 42 in the direction indicated by arrow 1'. That movement separates the pinch roller 13 from the capstan 5.

In the FWD mode, as described above, the take-up reel gears 66 and 73 are moved to the FWD positions indicated by the solid lines in FIG. 15. In contrast, in the FF mode, the second actuating lever 36 pivots in the direction indicated by arrow n' in FIG. 16D and the end of the arm 36b moves in the direction of the arrow q in FIG. 15 and, as shown in dot-dash lines in FIG. 15, cooperates with the inclined camming surface 161 of the pusher lever 41 to move the take-up reel table gears 66 and 73 in the direction of the arrow r. In that position, the take-up reel auxiliary gear 66 is in a position, to be engaged by the transfer drive gear 28 and the take-up reel main gear 73 is moved out of engagement with the main drive gear 29.

Figure 19D:
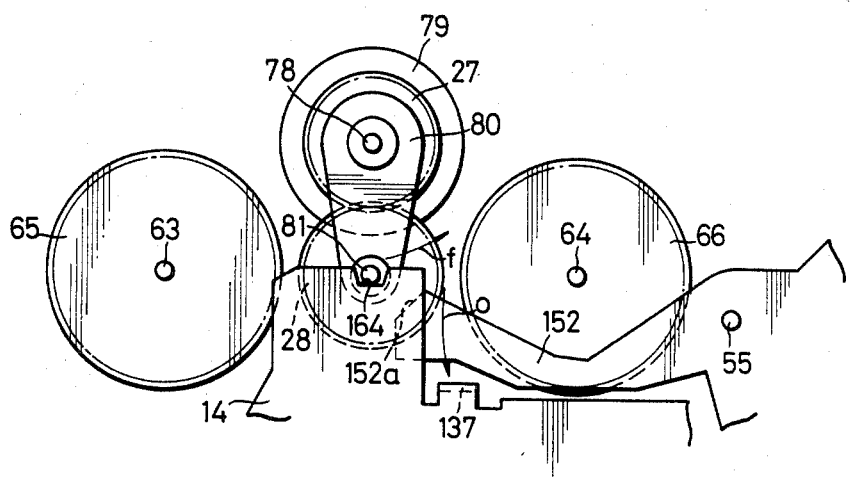

The normal forward rotation of the take-up reel table 4 is interrupted and, but for the fact that the PAUSE mode has been selected, the take-up reel table 4 would be driven in the FF mode by the transfer drive gear 28. In the PAUSE mode, as shown in FIG. 19D, just as in the FF mode, the positioning arm 152 of the second locking lever 37 is moved free of the pivot lever 80 as a result of energizing the solenoid 109. In other words, the second locking lever 37 moves as if the FF mode had been selected. However, the end of the pivot pin 81 of the transfer drive gear 28 is positioned in the notch 164 in the head plate 14, so that the pivot lever 80 will not pivot in the direction of the arrow f.

Thus, when the PAUSE mode button is depressed in the FWD mode, the tape 19 in the cassette 2, which has been driven at the normal speed in the direction of the arrow v, is stopped.

When a STOP mode button is depressed to re-establish the STOP mode of the tape deck when it is in any of the FWD, FF, REW, ADS and PAUSE modes, the motor 25 is stopped and the solenoid coils 108 and 109 are deenergized. If the solenoid coil 109 had been energized, the second actuating lever 36 and locking lever 37 are in the positions shown in FIG. 18D. The force on the pause slider 42 due to the spring 125 forces the actuating lever 36 against the end of the follower arm 151 of the locking lever 37. That forces locking lever 37 in the direction of the arrow o' to release the second actuating lever 36 from the position shown in FIG. 18D. The second actuating lever 36 and the second locking lever 37 are thus returned to their rest positions by the PAUSE slider 42. The head plate 14 moves to its rest position as a result of spring 119. The head plate 14 moves the head-pinch roller interlocking lever 39 to its rest position, which allows the pinch roller slide 38 and the pinch roller lever 16 to move to their rest positions. The tab 137 on the head plate 14 moves the first actuating lever 34 to its rest position. The FWD locking pin 126 on the head plate 14 acts on the edge 140a of the locking arm 140 of the first locking lever 35 to return it to its rest position. The torsion spring 160 moves the engagement lever 40 to its rest position, thus moving the pusher lever 41 to its rest position, and permitting the take-up reel gears 66 and 73 to assume their rest positions. When establishing the STOP mode from the FF mode, the positioning arm 152 of the second locking lever 37 is pivoted in the of the indicated by arrow o' as shown in FIG. 19C. Then, by the guiding action of an inclined surface 152a formed at the end of the positioning arm 152, the pivot lever 80 is moved in the direction of the arrow f' from the FF position shown in FIG. 19C to the STOP position shown in FIG. 19A.

In the above description the terms "vertical", "up", etc., were used to make clearer the description of the embodiment of the present invention illustrated herein. Their use was not intended to limit the scope of the present invention to a mode changing apparatus having the orientation shown in the accompanying drawings. Rather, they were used only to make the description of that illustrative embodiment of the invention more conveniently and easily understood.

Although the present invention has been described with reference to one illustrative embodiment thereof, the scope of the invention is not limited to the embodiment shown. Various changes and modifications, other than those specifically described, may be made by one of ordinary skill in the art, without departing from the spirit or scope of the present invention. For example, the chassis 1 of the mode changing apparatus need not be oriented vertically as in the illustrated embodiment. Therefore, the scope of the invention is intended to be defined solely by the appended claims.

What is claimed is:

1. A mode changing apparatus for a tape recording/reproducing apparatus, of the type including a mode changing mechanism having a rotatable changing gear with a toothless gap on the toothed periphery thereof, a magnet mounted on said changing gear for rotation therewith and electromagnetic yoke means for cooperating with said magnet to cause initial angular displacement of the changing gear from a staging position, in which the toothless gap faces a drive gear, to an actuating position, in which the toothed periphery engages the drive gear to turn said changing gear, when said yoke means is energized, the mode changing apparatus comprising:
   a pair of mode changing members engageable with cam means mounted to said changing gear for rotation therewith and movable, in response to rotation of said changing gear, from inactive positions to active positions against the force of spring means;
   holding means movable toward a holding position in response to movement of said mode changing members toward said active positions, wherein said holding means in said holding position holds said mode changing members in said active positions against the force of said spring means; and
   armature means mounted to said holding means for movement into contact with said yoke means in response to movement of said holding means toward said holding position to magnetically hold said holding means in said holding position.

2. The mode changing apparatus in claim 1; wherein:
   said mode changing members comprise actuating lever means movable by said cam means and locking lever means;
   said holding means comprises a holding arm on said locking lever means;
   said locking lever means is held in said active position by said yoke means; and
   holding said locking lever means in said active position prevents the return of said actuating lever means to said inactive position.

3. The mode changing apparatus in claim 2; further comprising mode establishing means for cooperating with said actuating lever means and said locking lever means to establish a plurality of operating modes of the tape recording/reproducing apparatus.

4. The mode changing apparatus in claim 3; wherein said actuating lever means is moved to said active position by said cam means and said locking lever means, when in said active position, stops said changing gear in its staging position.

5. The mode changing apparatus in claim 4; further comprising:
   chassis means carrying said mode changing mechanism, said drive gear, said electromagnetic yoke means, and said mode establishing means;
   a head plate mounted on said chassis for translation between an operative position in which at least one transducer mounted to said head plate is in contact with the tape with sufficient pressure to transfer signals thereto and an inoperative position in which said transducer is out of contact with the tape;
   a pinch roller mounted on said chassis for movement between an operative position in which it pinches the tape between itself and a capstan adapted to be driven by a motor and an inoperative position separated from said capstan;
   a fast forward drive means rotatably mounted to said chassis for rotation by the motor;
   a take-up reel table rotatably mounted on said chassis for accepting a tape reel in driving relation therewith, said take-up reel table having take-up reel drive means associated therewith for driving said take-up reel table, wherein said take-up reel drive means can be positioned for selective engagement with said drive gear and said fast forward drive means;
   fast forward mode establishing means for positioning said take-up reel drive means for engagement with said fast forward drive means and positioning said pinch roller in said inoperative position in response to movement of said actuating lever means by said cam means, for positioning said fast forward drive means for engagement with said take-up reel drive means in response to rotation of the motor and movement of said locking lever means to said holding position and for maintaining said fast forward mode while said locking lever means is held in said holding position; and
   pause mode establishing means for positioning said pinch roller out of engagement with said capstan and positioning said take-up reel drive means out of engagement with said drive gear in response to movement of said actuating lever means by said cam and for maintaining said pause mode while said locking lever means is held in said holding position.

6. The mode changing apparatus in claim 5; further comprising:
   a supply reel table for accepting another tape reel in driving relation therewith;
   a supply reel drive for driving said supply reel table; and
   rewind mode establishing means for positioning said fast forward drive means for engagement with said supply reel drive in response to reverse rotation of the motor.

7. The mode changing apparatus in claim 6; further comprising forward mode establishing means for positioning said head plate and said pinch roller in said operative positions and positioning said take-up reel drive means for engagement with said drive gear and an automatic scanning mode establishing means, in which the signals on the tape can be reproduced during said fast forward and rewind modes, by first establishing said forward mode, next establishing said fast forward mode and then releasing said head plate to move toward its inoperative position, said automatic scanning mode establishing means including a locking hook on a second locking lever means for holding said head plate in an intermediate position in which said transducer lightly contacts the tape moving therepast, whereby energizing the motor in one of the forward and reverse directions thereof will engage the respective reel table gears with said fast forward drive gear means to transport the tape at the fast forward and rewind speeds past said transducer.

8. The mode changing apparatus in claim 6; wherein:
said fast forward drive means includes a fast forward drive gear adapted to be driven by the motor, a transfer drive gear pivotally mounted to said fast forward drive gear in engagement therewith and means for pivoting said transfer drive gear toward said take-up reel drive means upon forward rotation of the motor and toward said supply reel drive upon reverse rotation of the motor;
said take-up reel drive means includes a take-up reel main gear and a take-up reel auxiliary gear;
said mode establishing means includes a pusher lever for cooperating with said actuating lever means to position said take-up reel auxiliary gear for engagement with said transfer drive gear in response to movement of said actuating lever means by said cam means and an engagement lever for cooperating with said head plate and said pusher lever to position said take-up reel main gear for engagement with said drive gear when said head plate moves to said operative position; and
said locking lever means includes a positioning arm for cooperating with said fast forward drive means to position said transfer drive gear out of engagement with said take-up reel auxiliary gear until said locking lever means moves to said holding position.

9. The mode changing apparatus in claim 8; wherein said head plate is arranged for cooperation with said fast forward drive means to prevent engagement of said transfer drive gear and said take-up reel auxiliary gear while said head plate is in said operative position, whereby said pause mode can be established by movement of said actuating lever means while said transfer drive gear is prevented from engaging said take-up reel auxiliary gear.

10. The mode changing apparatus in claim 9; wherein said mode establishing means includes a pause slider mounted to said chassis for translation by said actuating lever means to position said pinch roller in response to movement of said actuating lever means by said cam means.

11. A tape recording/reproducing apparatus comprising:
a first mode changing mechanism including a first rotatable changing gear having a toothless portion on the toothed periphery thereof, a first magnet on said changing gear for rotation therewith, a first selectively energizable electromagnetic triggering yoke means for cooperating with said first magnet to cause angular displacement of said changing gear from a staging position, in which the toothless gap faces a drive gear, to an actuating position, in which the toothed periphery engages the drive gear, when said yoke means is energized and a first cam mounted on said first changing gear for rotation therewith;

a second mode changing mechanism including a second changing gear having a toothless portion on the toothed periphery thereof, therewith, a second magnet thereon for rotation with said second changing gear, a second selectively energizable electromagnetic triggering yoke means for cooperating with said second magnet to cause angular displacement of said changing gear from a staging position, in which the toothless gap faces a drive gear, to an actuating position, in which the toothed periphery engages the drive gear, when said yoke means is energized,
a second cam mounted on said second changing gear for rotation therewith;
a rotatably mounted drive gear for driving said first and second changing gears;
a motor for driving said drive gear;
first electromagnetic holding yoke means associated with said said first mode changing mechanism;
second electromagnetic holding yoke means associated with said second mode changing mechanism;
a first actuating lever means for cooperating with said first cam to move said first actuating lever in response to rotation of said first changing gear;
a second actuating lever means for cooperating with said second cam to move said second actuating lever in response to rotation of said second changing gear;
first locking lever means, including first armature means movable toward said first electromagnetic holding yoke means, movable into a holding position in response to movement of said first actuating lever means, wherein said first electromagnetic holding yoke means is energized upon energization of said first electromagnetic triggering yoke means to magnetically hold said first armature means and thereby hold said first locking lever means in said holding position;
second locking lever means, including second armature means movable toward said second electromagnetic means movable into a holding position in response to movement of said second actuating lever means, wherein said second electromagnetic holding yoke means is energized upon energization of said second electromagnetic triggering yoke means to magnetically hold second armature means and thereby hold said second locking lever means in said holding position; and
mode establishing means for cooperating with said actuating lever means and said locking lever means for establishing a plurality of operating modes of the tape recording/reproducing apparatus.

12. The tape recording/reproducing apparatus in claim 11; further comprising:
chassis means carrying said mode changing mechanisms, said drive gear, said electromagnetic means, and said mode establishing means;
a head plate mounted on said chassis for translation between an operative position in which at least one transducer mounted to said head plate is in contact with the tape with sufficient pressure to transfer signals thereto and an inoperative position in which said transducer is out of contact with the tape;
a pinch roller mounted on said chassis for movement between an operative position in which it pinches the tape between itself and a capstan adapted to be driven by a motor and an inoperative position separated from said capstan;

a fast forward drive gear means rotatably mounted to said chassis for rotation by said motor;

a take-up reel table rotatably mounted on said chassis for accepting a tape reel in driving relation therewith, said take-up reel table having take-up reel drive means associated therewith for driving said take-up reel table, wherein said take-up reel drive means can be positioned for selective engagement with said drive gear and said fast forward drive means;

a supply reel table for accepting another tape reel in driving relation therewith;

a supply reel drive for driving said supply reel table;

forward mode establishing means for positioning said head plate and said pinch roller in said operative positions and positioning said take-up reel drive means for engagement with said drive gear in response to movement of said first actuating lever means by said first cam and for maintaining said forward mode of while said first locking lever means is held in said holding position;

fast forward mode establishing means for positioning said take-up reel drive means for engagement with said fast forward drive means and positioning said pinch roller in said inoperative position in response to movement of said second actuating lever means by said second cam, for positioning said fast forward drive means for engagement with said take-up reel drive means in response to forward rotation of said motor and movement of said second locking lever means to said holding position and for maintaining said fast forward mode while said second locking lever means is held in said holding position;

pause mode establishing means, in which tape translation is interrupted while in said forward mode, for positioning said pinch roller out of engagement with said capstan and for positioning said take-up reel drive means out of engagement with said drive gear in response to movement of second actuating lever means by said second cam and for maintaining said pause mode while said second locking lever means is held in said holding position; and rewind mode establishing means for positioning said fast forward drive means for engagement with said supply reel drive in response to reverse rotation of said motor.

13. The tape recording/reproducing apparatus in claim 12 wherein:

said fast forward drive means includes a fast forward drive gear adapted to be driven by said motor, a transfer drive gear pivotally mounted to said fast forward drive gear in engagement therewith and means for pivoting said transfer drive gear toward said take-up reel drive means upon forward rotation of said motor and toward said supply reel drive upon reverse rotation of said motor;

said take-up reel drive means includes a take-up reel main gear and a take-up reel auxiliary gear;

said mode establishing means includes a pusher lever for cooperating with said second actuating lever means to position said take-up reel auxiliary gear for engagement with said transfer drive gear in response to movement of said second actuating lever means by said second cam and an engagement lever for cooperating with said head plate and said pusher lever to position said take-up reel main gear for engagement with said drive gear when said head plate moves to said operative position;

said second locking lever means includes a positioning arm for cooperating with said fast forward drive means to position said transfer drive gear out of engagement with said take-up reel auxiliary gear until said second locking lever means moves to said holding position; and said head plate is arranged for cooperation with said fast forward drive gear means to prevent engagement of said transfer drive gear and said take-up reel auxiliary gear while said head plate is in said operative position, whereby said pause mode can be established by movement of said second actuating lever means while said transfer drive gear is prevented from engaging said take-up reel auxiliary gear.

* * * * *